United States Patent [19]
Fujisawa

[11] Patent Number: 5,691,969
[45] Date of Patent: Nov. 25, 1997

[54] COMPACT DISK APPARATUS HAVING ENHANCED DISK HANDLING CAPABILITIES

[75] Inventor: Shinichi Fujisawa, Akigawa, Japan

[73] Assignee: Teac Corporation, Tokyo, Japan

[21] Appl. No.: 418,270

[22] Filed: Apr. 6, 1995

[30] Foreign Application Priority Data

Apr. 7, 1994 [JP] Japan .................................. 6-069782
Apr. 7, 1994 [JP] Japan .................................. 6-069783

[51] Int. Cl.$^6$ ..................................................... G11B 33/02
[52] U.S. Cl. ....................................................... 369/77.1
[58] Field of Search ............................. 369/75.2, 77.1, 369/258, 264; 360/99.06, 99.07, 99.02

[56] References Cited

U.S. PATENT DOCUMENTS

| | | | |
|---|---|---|---|
| 5,172,361 | 12/1992 | Urushibata et al. | 369/77.1 |
| 5,237,555 | 8/1993 | Tsuruta et al. | 369/77.2 |
| 5,251,195 | 10/1993 | Kawakami et al. | 369/75.2 |
| 5,365,506 | 11/1994 | Lee | 369/75.2 |
| 5,434,839 | 7/1995 | Choi | 369/75.2 |
| 5,459,703 | 10/1995 | Tanaka | 369/36 |
| 5,463,611 | 10/1995 | Kim | 369/191 |
| 5,473,593 | 12/1995 | Wheeler | 369/77.1 |

FOREIGN PATENT DOCUMENTS

| | | |
|---|---|---|
| 3-286467 | 12/1991 | Japan . |
| 4-3360 | 1/1992 | Japan . |

Primary Examiner—Robert S. Tupper
Assistant Examiner—George J. Letscher
Attorney, Agent, or Firm—Michael N. Meller

[57] ABSTRACT

A compact disk apparatus includes: a tray including a toothed surface, the tray is movable between a disk inserting/removing position and a disk loaded position; a movable base unit including a supporting part, the supporting part supports a disk when the tray is at the disk loaded position, the movable base unit is movable between an unsupported position and a supported position, the disk being supported on the supporting part when the movable base unit is at the supported position; a drive unit which converts electric current into a rotating force; the disk apparatus further includes a first gear engaged with the toothed surface of the tray, the tray being movable between the disk inserting/removing position and the disk loaded position by rotating the first gear; a second gear rotated by the rotating force of the drive unit, the second gear being arranged to be movable between a first position and a second position, wherein the second gear is engaged with the first gear when the second gear is at the first position, the first gear being rotated by the second gear through the engagement to move the tray to the disk loaded position, and wherein, after the tray reaches the disk loaded position, the tray is locked and the second gear is rotated around a periphery of the first gear by the rotating force of the drive unit, so that the second gear is moved from the first position to the second position; and a moving unit for moving the movable base unit from the unsupported position to the supported position in accordance with the movement of the second gear.

9 Claims, 25 Drawing Sheets

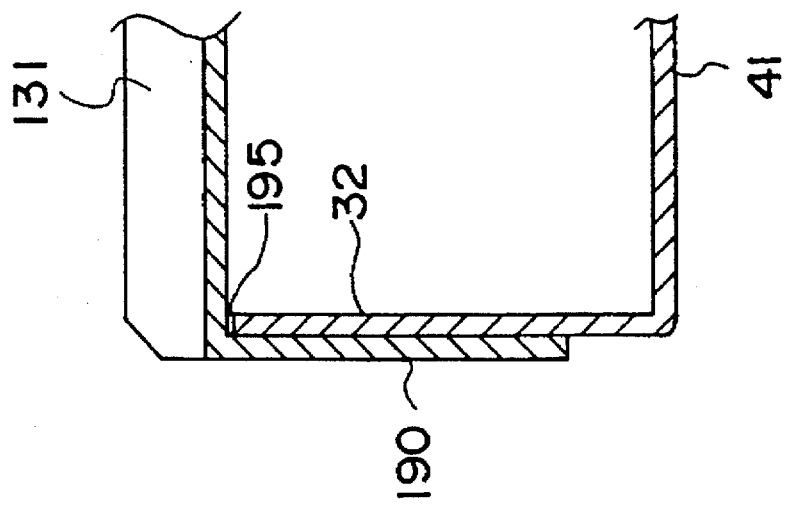
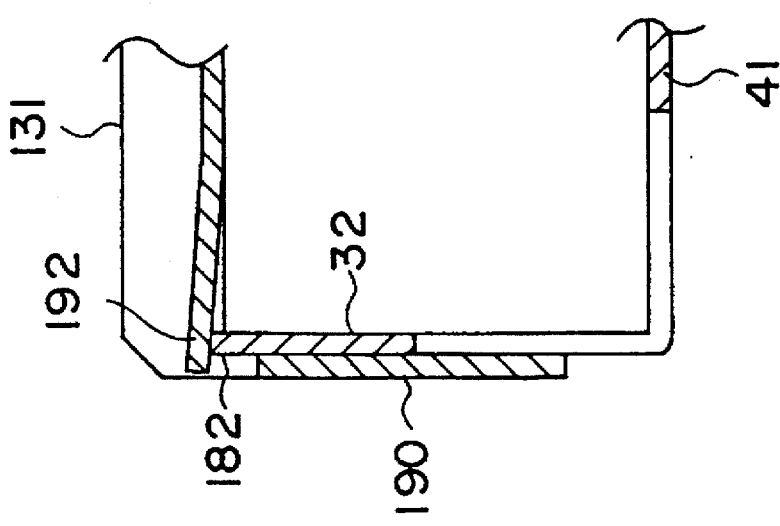
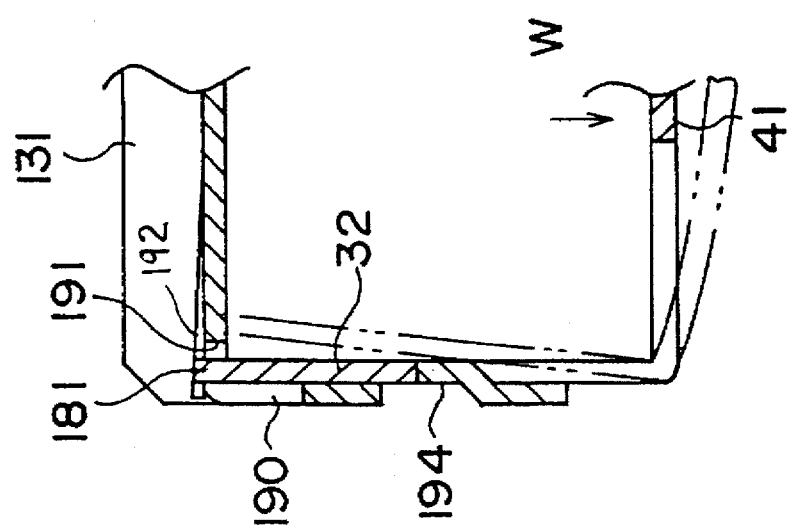

COMPACT DISK APPARATUS HAVING ENHANCED DISK HANDLING CAPABILITIES

BACKGROUND OF THE INVENTION (1) Field of the Invention

The present invention generally relates to a compact disk apparatus, and more particularly to a compact disk apparatus having a disk loading and unloading mechanism in which a disk on a disk carrying tray is loaded into and unloaded from the disk apparatus.

(2) Description of the Prior Art

It is desirable that a disk apparatus of the kind in which a disk on a disk carrying tray is loaded and unloaded has a small size and the cost of manufacture of the disk apparatus is inexpensive.

A conventional disk device of this kind includes a disk loading mechanism for loading a disk such as a CD-ROM (compact-disk read-only memory) into and unloading the same from the disk device by using a disk carrying tray. The disk loading mechanism usually carries out two major operations related to the above disk loading operations which are:

1) a movement of the tray on which the disk is placed, to the inside of the disk device; and 2) a setting of the disk to a disk supported position within the disk device so that the disk is supported on a turn table of a drive mechanism.

Generally, the conventional disk device carries out the movement operation by driving one motor, and carries out the setting operation by driving another motor.

In order to design a disk apparatus with a simple structure and reduce the cost of the manufacture thereof, a disk loading device which drives only one motor to carry out the above two operations has been proposed. For example, Japanese Laid-Open Patent Application No. 4-3360 discloses such a disk loading device.

The disk loading device, disclosed in the above publication, includes a gear engaged with a rack of a disk carrying tray, the gear being rotated by one revolution (about 360 degrees) by one motor to move the disk on the tray to a disk supported position. In this disk loading device, a toothed portion of the gear is connected to the rack of the tray, and a cam groove of the gear is connected to a mechanism for supporting the disk on a turn table.

However, in the above prior art disk loading device, it is necessary to use a gear with a relatively large diameter in order to move the disk by a distance from a disk inserting/removing position to the disk supported position by rotating the gear by the motor. The gear is vertically arranged therein to rotate the gear on a vertical surface. Thus, the conventional disk loading device requires a broad space in which the gear is housed in the disk loading device.

It is difficult to realize a disk apparatus having a smaller size by using the conventional disk loading device in which the above-mentioned gear has to be housed in the disk loading device. Also, it is difficult to realize a disk apparatus having a smaller size even if the above-mentioned gear is horizontally arranged therein to rotate the gear on a horizontal surface.

In addition, Japanese Laid-Open Patent Application No. 3-286467 discloses an emergency unloading device of a disk apparatus. This emergency unloading device is provided to quickly unload the disk from the disk apparatus when a power failure or other malfunction has occurred. In order to actuate the emergency unloading device, it is necessary that an operator applies an external force to the emergency unloading device.

In the emergency unloading device disclosed in the above publication, the applied external force must be connected to a motor of the drive mechanism of the disk apparatus. Thus, the force needed to actuate the emergency unloading action is relatively large because the load of the motor is added to the operator when the external force is applied. Accordingly, it is difficult that the above emergency unloading device is smoothly actuated even when a slight external force is applied by the operator.

SUMMARY OF THE INVENTION

Accordingly, it is a general object of the present invention to provide an improved disk apparatus in which the above described problem is eliminated.

Another object of the present invention is to provide a disk apparatus with a disk loading mechanism which has a small size and can safely and reliably perform the disk loading and unloading operations.

Still another object of the present invention is to provide a disk apparatus with an emergency unloading mechanism which realizes a smooth emergency unloading operation even when a slight external force is applied which is convenient to an operator.

The above-mentioned object of the present invention is achieved by a disk apparatus which includes: a tray including a toothed surface, the tray being arranged to be movable between a disk inserting/removing position and a disk loaded position; a movable base unit including a supporting part, the supporting part capable of supporting a disk when the tray is at the disk loaded position, the movable base unit being arranged to be movable between an unsupported position and a supported position, the disk being supported on the supporting part when the movable base unit is at the supported position; a drive unit which converts electric current into a rotating force; a first gear engaged with the toothed surface of the tray, the tray being moved between the disk inserting/removing position and the disk loaded position by rotating the first gear; a second gear rotated by the rotating force of the drive unit, the second gear being arranged to be movable between a first position and a second position, wherein the second gear is engaged with the first gear when the second gear is at the first position, the first gear being rotated by the second gear through the engagement to move the tray to the disk loaded position, and wherein, after the tray reaches the disk loaded position, the tray is locked and the second gear is rotated around a periphery of the first gear by the rotating force of the drive unit, so that the second gear is moved from the first position to the second position; and a moving unit for moving the movable base unit from the unsupported position to the supported position in accordance with the movement of the second gear from the first position to the second position.

The above-mentioned object of the present invention is achieved by a disk apparatus which includes: a movable base unit including a supporting part, the supporting part capable of supporting a disk when a tray is at a disk loaded position, the movable base unit being arranged to be movable between an unsupported position and a supported position, the disk being supported on the supporting part when the movable base unit is at the supported position; a drive unit which converts electric current into a rotating force; a moving unit which is arranged to be movable between a first position and a second position, the movable base unit being moved to the supported position when the moving unit is moved to the first position, and the movable base unit being moved to the unsupported position when the moving unit is moved to the second position; a transmission unit for transmitting the rotating force of the drive unit to the moving unit through a force transmission channel, to move the moving unit from the first position to the second position; and an emergency arm which is actuated in a first rotating direction by a biasing force of a spring and is rotated in a rotating direction opposite to the first rotating direction by a manual operating force of an operator against the biasing force of the spring to unload the disk from the disk apparatus when the moving unit is at the first position and the movable base unit is at the supported position, the emergency arm being rotated to move the movable base unit from the supported position to the unsupported position, wherein the transmission of the rotating force of the drive unit to the moving unit through the force transmission channel is canceled when the emergency arm is rotated by the manual operating force, and the moving unit is allowed to be moved from the first position to the second position, thereby moving the movable base unit to the unsupported position.

According to the present invention, the movement of the tray can be carried out by rotating the first gear means and the vertical rotation of the movable base unit can be carried out by rotating the second gear around the periphery of the first gear means. Thus, the diameter of the first gear means and the size of the disk loading mechanism can be reduced, and it is possible to provide a disk apparatus having a remarkably small size. Also, the disk apparatus according to the present invention can safely and reliably perform the disk loading and unloading operations which is convenient to the operator. Also, it is possible to realize a remarkably smooth emergency unloading operation of the emergency unloading mechanism of the disk apparatus even when a slight external force is applied which is convenient to the operator.

BRIEF DESCRIPTION OF THE DRAWINGS

The above and other objects, features and advantages of the present invention will be more apparent from the following detailed description when read in conjunction with the accompanying drawings in which:

FIGS. 21A, 21B and 21C are cross-sectional views of the mounting portion of the clamper holder;

DESCRIPTION OF THE PREFERRED EMBODIMENTS

Figure 1:
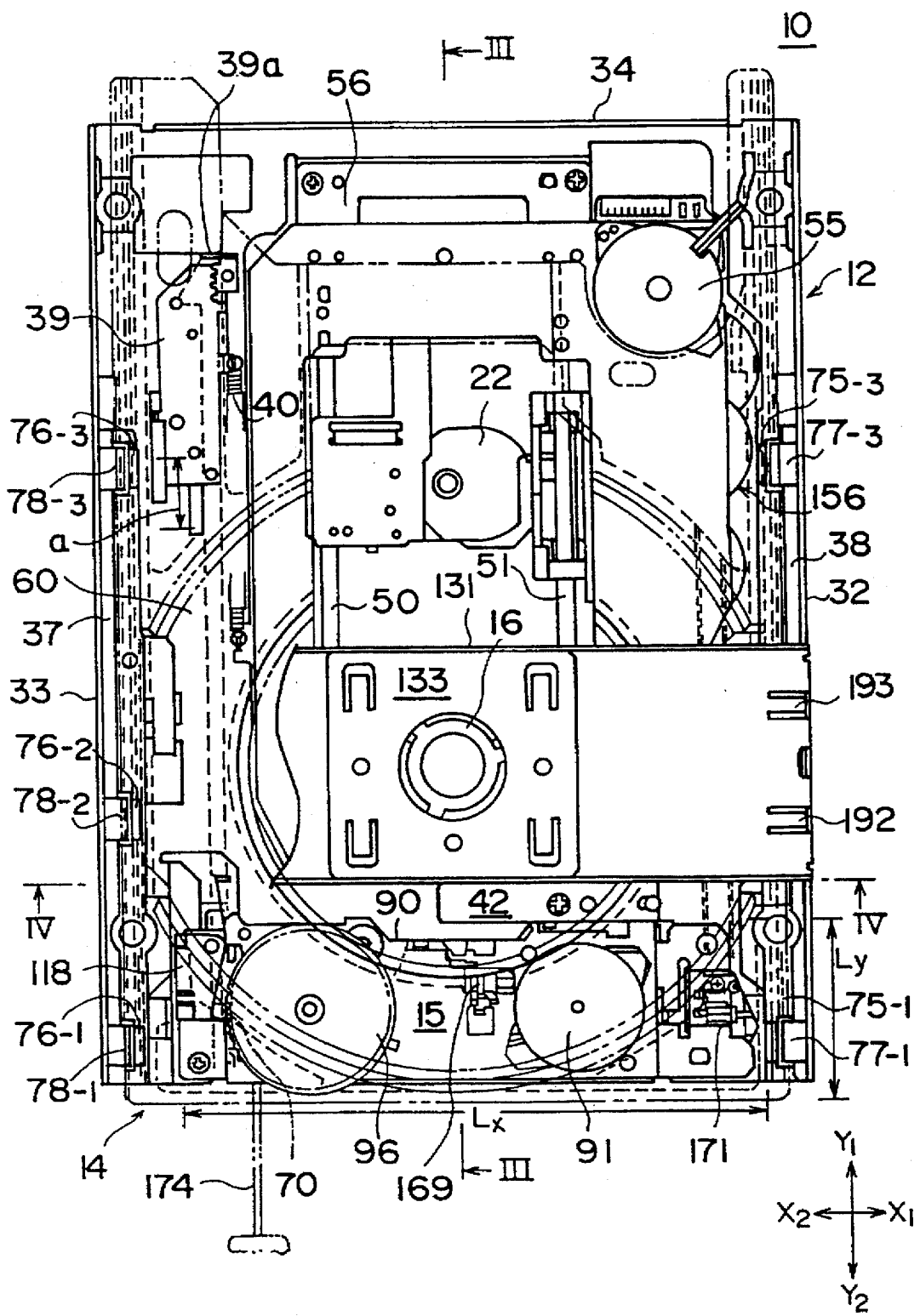
FIG. 1 is a plan view of a CD-ROM system in one embodiment of the present invention.

A description will now be given of a CD-ROM system in one embodiment of the present invention with reference to the accompanying drawings.

As shown in FIGS. 1 through 7, the CD-ROM system 10 includes a chassis 11, a base 12 mounted on the chassis 11, a movable base unit 13 mounted on the base 12, a tray 14 supported on the base 12, a disk loading mechanism 15 mounted on the base 12, a clamper 16 supported on the base 12, a front bezel 17 attached to the front of chassis 11, and a cover plate (not shown in the drawings) which covers the top of the CD-ROM system 10.

The movable base unit 13 includes a movable base 19, a turn table 20, a turn table motor 21 which rotates the turn table 20, an optical head 22, and a head moving unit 23 which moves the optical head 22.

Figure 8A:
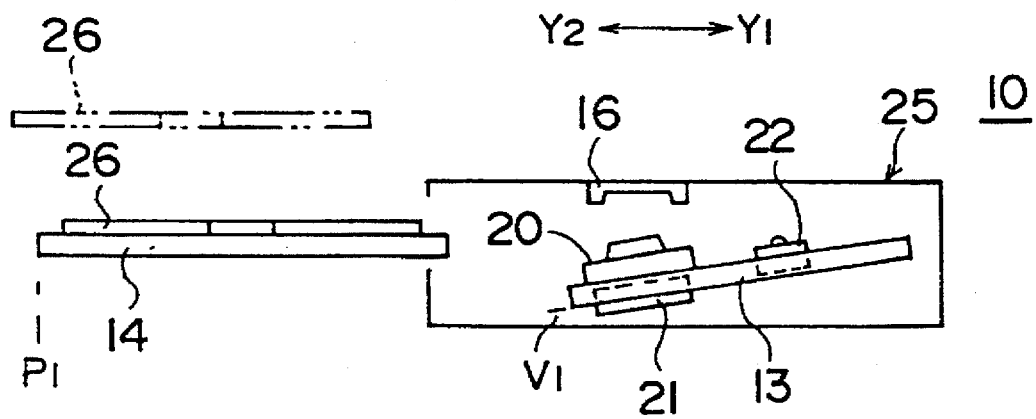
FIGS. 8A through 8C are diagrams for explaining operations of the disk loading mechanism.

When a disk 26 such as a CD-ROM is inserted, the CD-ROM system 10 is in an initial condition shown in FIG. 8A. The direction of the insertion is indicated by an arrow Y1 in FIG. 8A, and the direction of unloading of the disk 26 from the system is also indicated by an arrow Y2 in FIG. 8A.

The direction of the insertion or loading the disk is referred to as the direction Y1, and the direction of the unloading or removing the disk is referred to as the direction Y2. The arrows Y1 and Y2 in FIG. 8A correspond to the arrows Y1 and Y2 in the other accompanying drawings.

Also, transversal directions perpendicular to the directions Y1 and Y2, as indicated by the arrows X1 and X2 in the accompanying drawings, are referred to as the directions X1 and X2.

As shown in FIG. 8A, when the disk 26 is inserted into the CD-ROM system 10, the tray 14 is moved in the direction Y2 so that the tray 14 projects from a body 25 of the CD-ROM system 10. The movable base unit 13 at this time is at a downward slanting position V1 shown in FIG. 8A.

An operator places the disk 26 on the tray 14, and manually depresses a control button to load the disk 26 into the CD-ROM system 10.

Figure 8B:
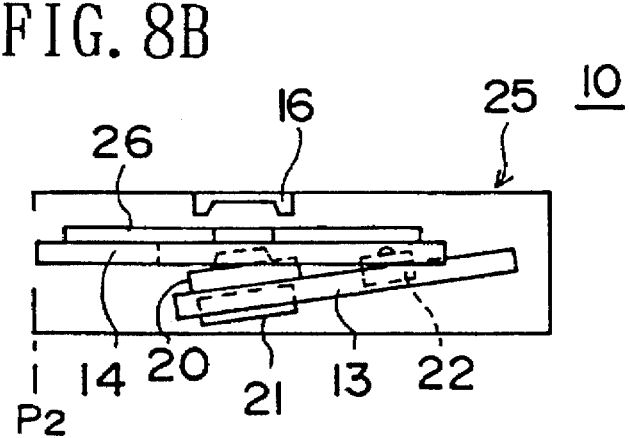

Two operations of the disk loading mechanism 15 are performed in response to the depression of the control button by the operator. The two operations of the disk loading mechanism 15 are:

(1) a movement of the tray 14 in the direction Y1. As a result, the disk 26 on the tray 14 is drawn into the body 25 of the CD-ROM system 10. A condition of the disk loading mechanism 15 at this time is shown in FIG. 8B.

Figure 8C:
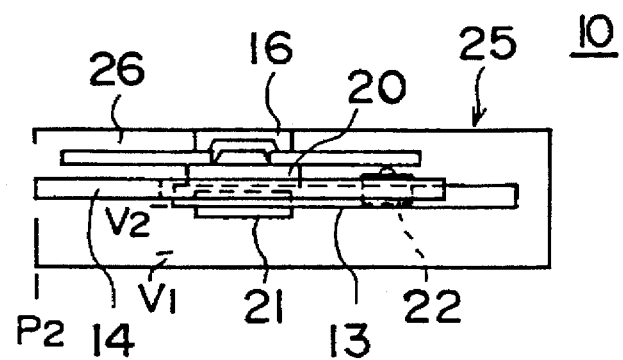

(2) a vertical rotation of the movable base unit 13. The movable base unit 13 is upwardly rotated from the slating position V1 to a horizontal position V2 shown in FIG. 8C. As a result, the tray 14 is supported on the turn table 20, and the disk 26 is raised from the tray 14 and clamped by the clamper 16 on the turn table 20, so that the CD-ROM system 10 can reproduce data from the disk 26 at this disk supported position. A condition of the disk loading mechanism 15 at this time is shown in FIG. 8C.

Next, a description will be given of a disk loading structure and operations related to the disk loading mechanism 15.

As shown in FIGS. 1 through 5, the base 12 is a frame-like part having a generally rectangular shape. The base 12 includes a mounting portion 30 with a generally rectangular opening, and the movable base unit 13 is mounted on this mounting portion 30. The base 12 includes a mounting portion 31 with a rectangular cut-out region at a front end thereof, and the disk loading mechanism 15 is mounted on this mounting portion 31.

In addition, the base 12 includes raised walls 32 and 33 at both sides thereof, and includes a raised rib 34 at a rear end thereof. The base 12 further includes four downwardly projecting legs 35 at four corners thereof. The base 12 is mounted on the chassis 11 in a raised condition with the legs 35 being arranged at four corners of a bottom plate 11a of the box-like chassis 11 through four insulators 36.

Tray guide members 37 and 38 which will be described later are mounted onto side portions of the base 12. A tray pushing plate 39 is arranged at one side portion of the base 12, and this tray pushing plate 39 is movable in the directions Y1 and Y2. The tray pushing plate 39 is actuated toward the direction Y2 by a biasing force of a spring 40 shown in FIG. 1.

MOVABLE BASE UNIT 13

As shown in FIGS. 1 through 5, the movable base unit 13 includes the turn table 20 and the movable base 19. The movable base 19 is a generally rectangular frame-like part. The turn table motor 21 is attached to a front portion of the movable base 19. The turn table 20 is secured to a spindle of the turn table motor 21. The turn table 20 is located at a position higher than the movable base 19. A permanent magnet 20a is arranged to the turn table 20.

On a bottom surface of the movable base 19, a pair of guide shafts 50 and 51 extending in parallel to the directions Y1 and Y2 are mounted. The ends of the guide shafts 50 and 51 are retained by retainers 52 and 53 on the bottom surface of the movable base 19.

The optical head 22 is supported at its sides on the guide shafts 50 and 51, and this optical head 22 is movable within an opening 54 of the movable base 19 in the directions Y1 and Y2.

The head moving unit 23 is mounted on the movable base 19. The head moving unit 23 includes a motor 55 and a gear train 156 driven by the motor 55.

Rear portions of the movable base 19 are secured to rear portions of the base 12 through a leaf spring 56, and the movable base unit 13 is arranged within the mounting portion 30 of the base 12. The movable base unit 13 is rotatable in directions indicated by arrows A and B in FIG. 3 by a resilient force of the leaf spring 56.

A pin 57 which projects from the front of the movable base 19 in the direction Y2 is attached to a front-end center portion of the movable base 19. The pin 57 may be brought into contact with a leaf spring 42 secured to a transversal bar portion 41 of the base 12.

TRAY 14

Figure 5:
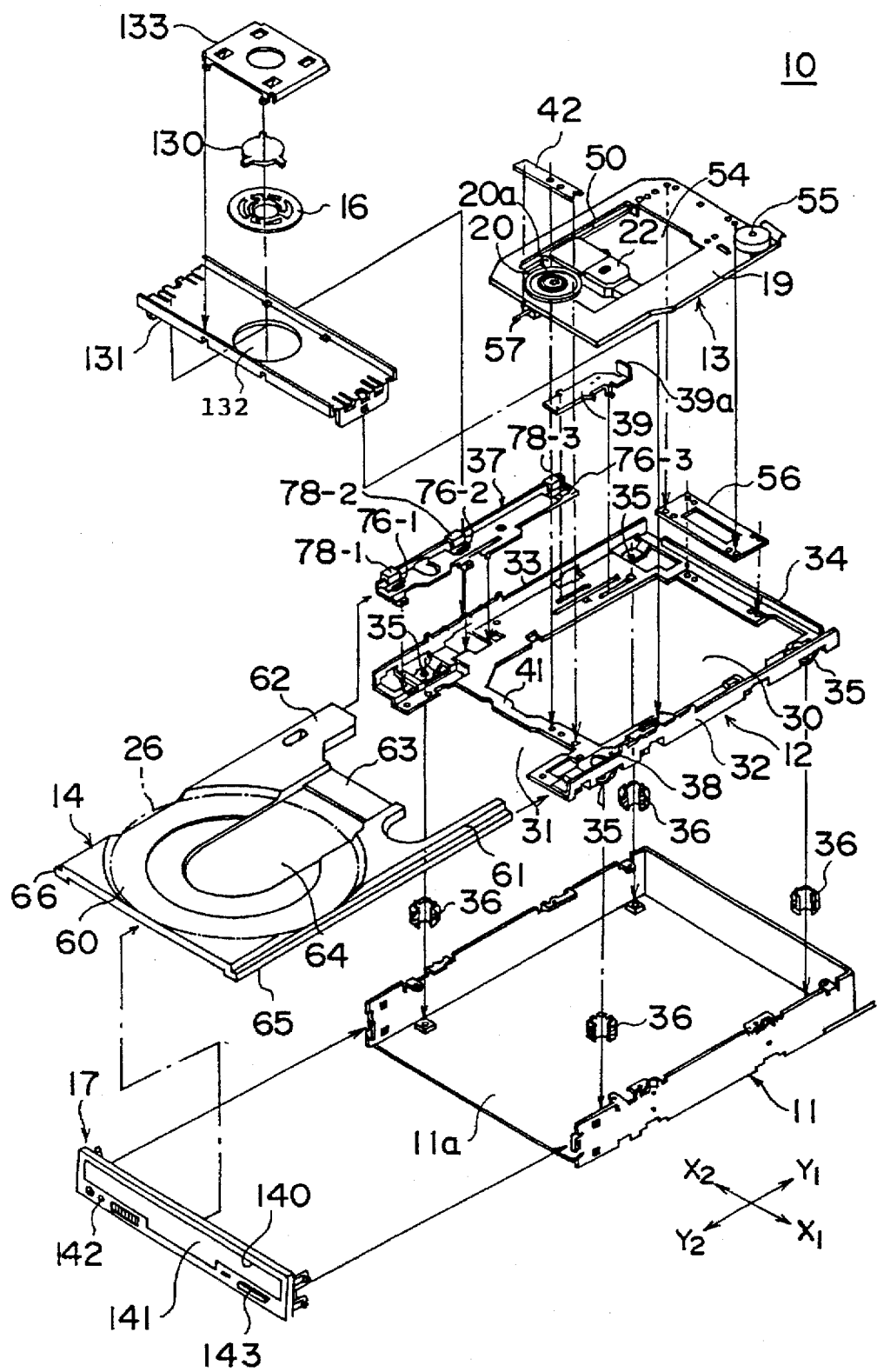
FIG. 5 is a perspective exploded view of the CD-ROM system in FIG. 1.
Figure 6:
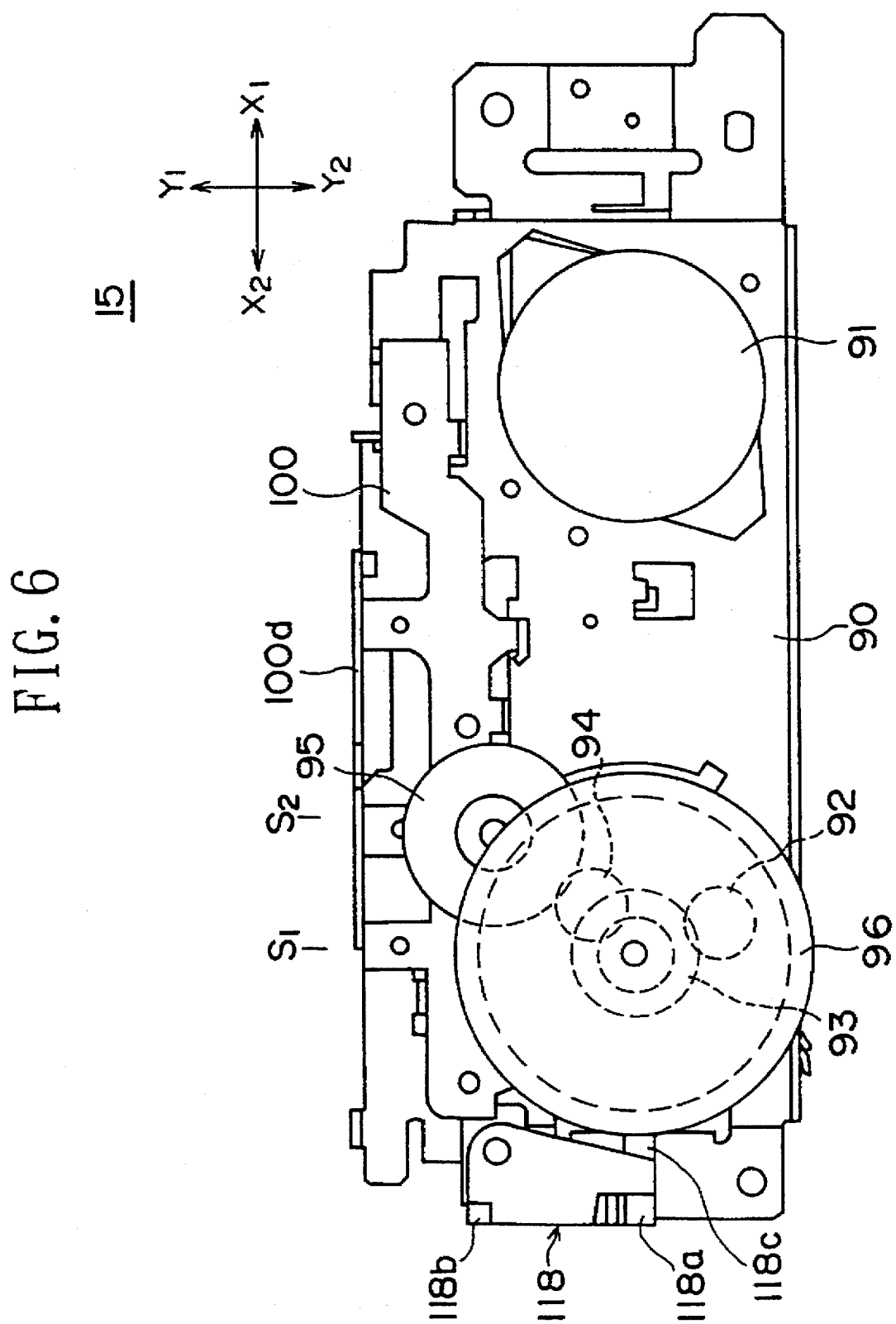
FIG. 6 is a plan view of a disk loading mechanism of the CD-ROM system.

The tray 14 includes, as shown in FIG. 5, a disk setting portion 60, arm portions 61 and 62, and a transversal portion 63 between the arm portions 61 and 62. The disk 26 such as the CD-ROM is placed onto the disk setting portion 60. The arm portions 61 and 62 extend in the direction Y1. The tray 14 includes a center opening 64 at its central portion, and the turn table 18 and the optical head 22 are arranged within the center opening 64.

In addition, the tray 14 includes brim portions 65 and 66 extending along side portions of the tray 14 which are lowered from the disk setting portion 60.

Figure 9:
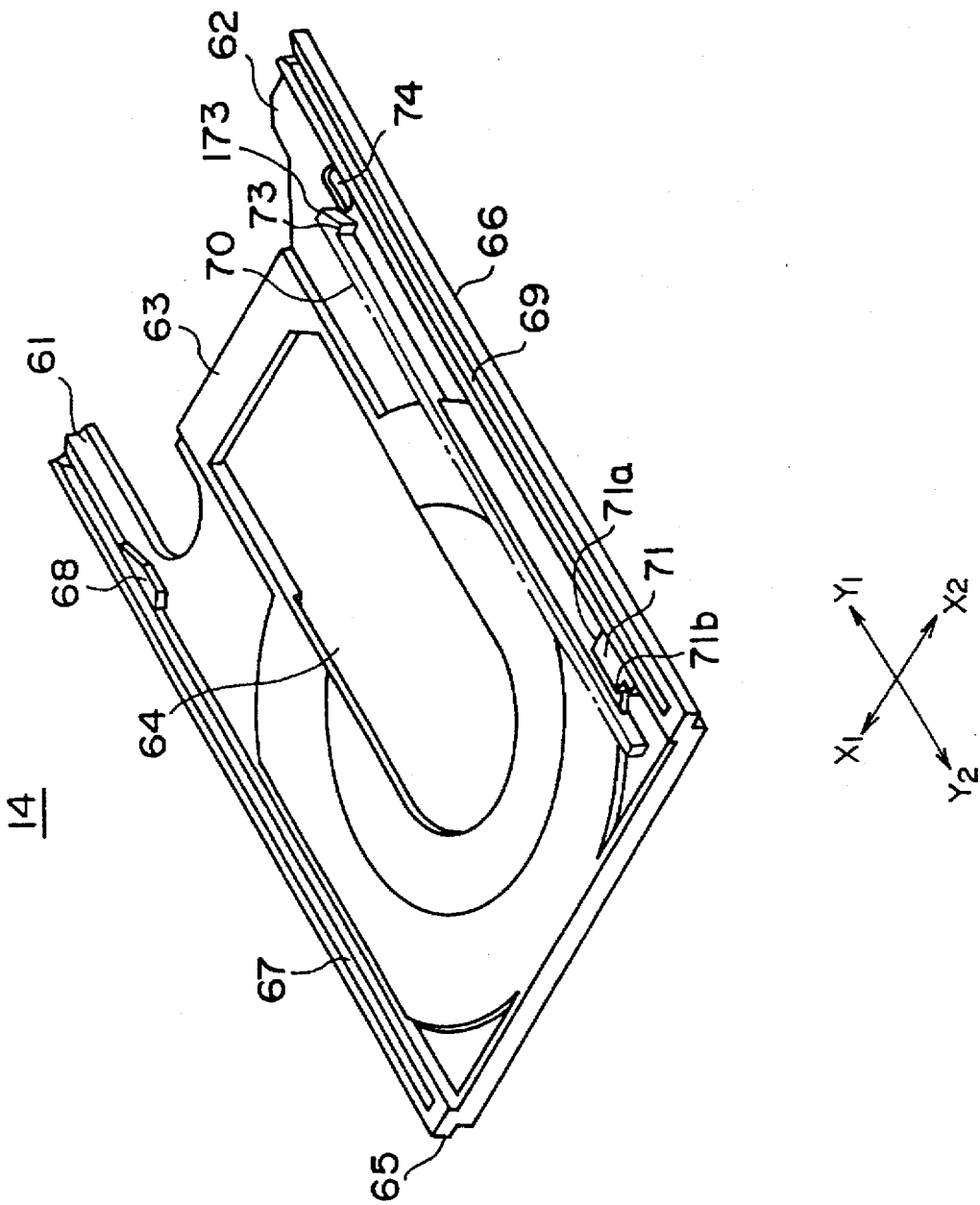
FIG. 9 is a perspective view of a bottom surface of a tray of the disk loading mechanism.

The tray 14 further includes, as shown in FIG. 9, a guide groove 67 and a projection 68 on one side of the bottom surface of the tray 14. The tray 14 includes a guide groove 69, a rack 70 with a toothed surface, a projection 71 with contact portions 71a and 71b, and a connecting portion 73 on the other side of the bottom surface of the tray 14.

The arm portion 62 of the tray 14 includes a hole 74 in the vicinity of the connecting portion 73.

Figure 2:
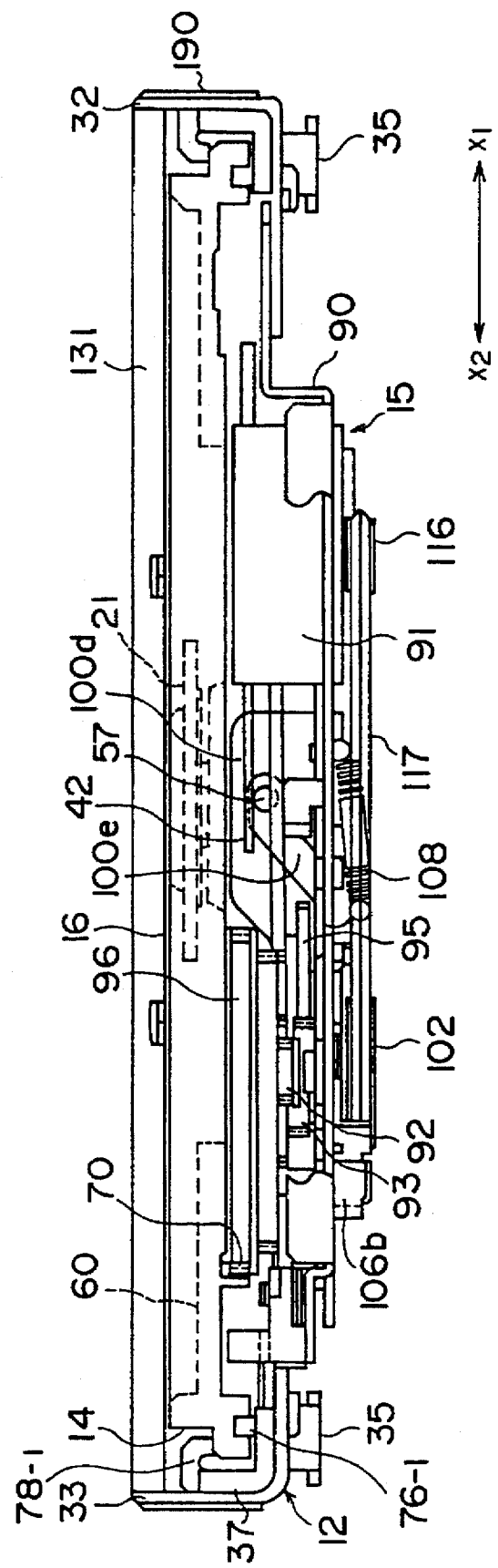
FIG. 2 is a front view of the CD-ROM system in FIG. 1.

As shown in FIGS. 1 and 2, the guide groove 67 of the tray 14 is fitted to three projections 75-1 through 75-3 of a tray guide member 38, and the guide groove 68 is fitted to three projections 76-1 through 76-3 of a tray guide member 37. The tray 14 is thus guided. The brim portion 65 is held by three retainers 77-1 through 77-3 of the tray guide member 38, and the brim portion 66 is held by three retainers 78-1 through 78-3 of the tray guide member 37. The tray 14 is thus guided and supported by the tray guide members 37 and 38, and it is movable in the directions Y1 and Y2 while it is held by the retainers.

Accordingly, the tray 14 is arranged to be movable forward and backward between a disk inserting/removing position P1 and a disk loaded position P2. When the tray 14 is at the disk inserting/removing position P1 shown in FIG. 8A, the disk 26 can be inserted into or removed from the CD-ROM system 19. When the tray 14 is at the disk loaded position P2 shown in FIGS. 8B and 8C, the disk 26 is loaded into the CD-ROM system 10.

A gear 96 which will be described later is engaged with the toothed side surface of the rack 70 of the tray 14.

DISK LOADING MECHANISM 15

As shown in FIGS. 1–2 and 6–7, the disk loading mechanism 15 includes a base plate 90 on which the relevant parts are supported.

A loading motor 91 which constitutes a drive means for rotating a gear of the disk loading mechanism 15 is mounted on a front portion of the base plate 90. A set of gears 92 through 96 and a rotating base 97 are mounted on a rear portion of the base plate 90. A slider 100 which moves the movable base unit 13 between an unsupported position and a disk supported position is mounted on a side portion of the base plate 90.

The set of gears 92 through 96 constitutes a reduction gear unit connected to the loading motor 91. Each of the gears 93 and 95 has two toothed wheels. The gear 96 constitutes a first gear means of the disk loading mechanism 15, and the gear 95 constitutes a second gear means of the disk loading mechanism 15. This gear 96 is a final-stage gear of the reduction gear unit, and it is engaged with the toothed surface of the rack 70 of the tray 14. The rotating force of the loading motor 91 is transmitted to the tray 14 through the reduction gear unit.

The gears 93 and 96 are supported by a pin 101 on the base plate 90. A collar 104 is rotatably arranged into a shaft 103 which is secured to a pulley 102, and the gear 92 is secured to the top of the shaft 103.

The collar 104 is arranged onto a slot 105 which is formed within the base plate 90. The slot 105 is spaced from a location of the pin 101 on the base plate 90. The slot 105 includes a circular opening 105a.

An emergency arm 106 is mounted on a bottom surface of the base plate 105 by using a pin 107, and the emergency arm 106 is rotatably supported by the pin 107. The emergency arm 106 is actuated in anticlockwise direction by a biasing force of a spring 108 shown in FIG. 2. The emergency arm 106 includes a U-shaped edge 106a, and the U-shaped edge 106a is fitted onto a lower portion of the collar 104 below an annular groove 104a thereof shown in FIG. 7.

Figure 7:
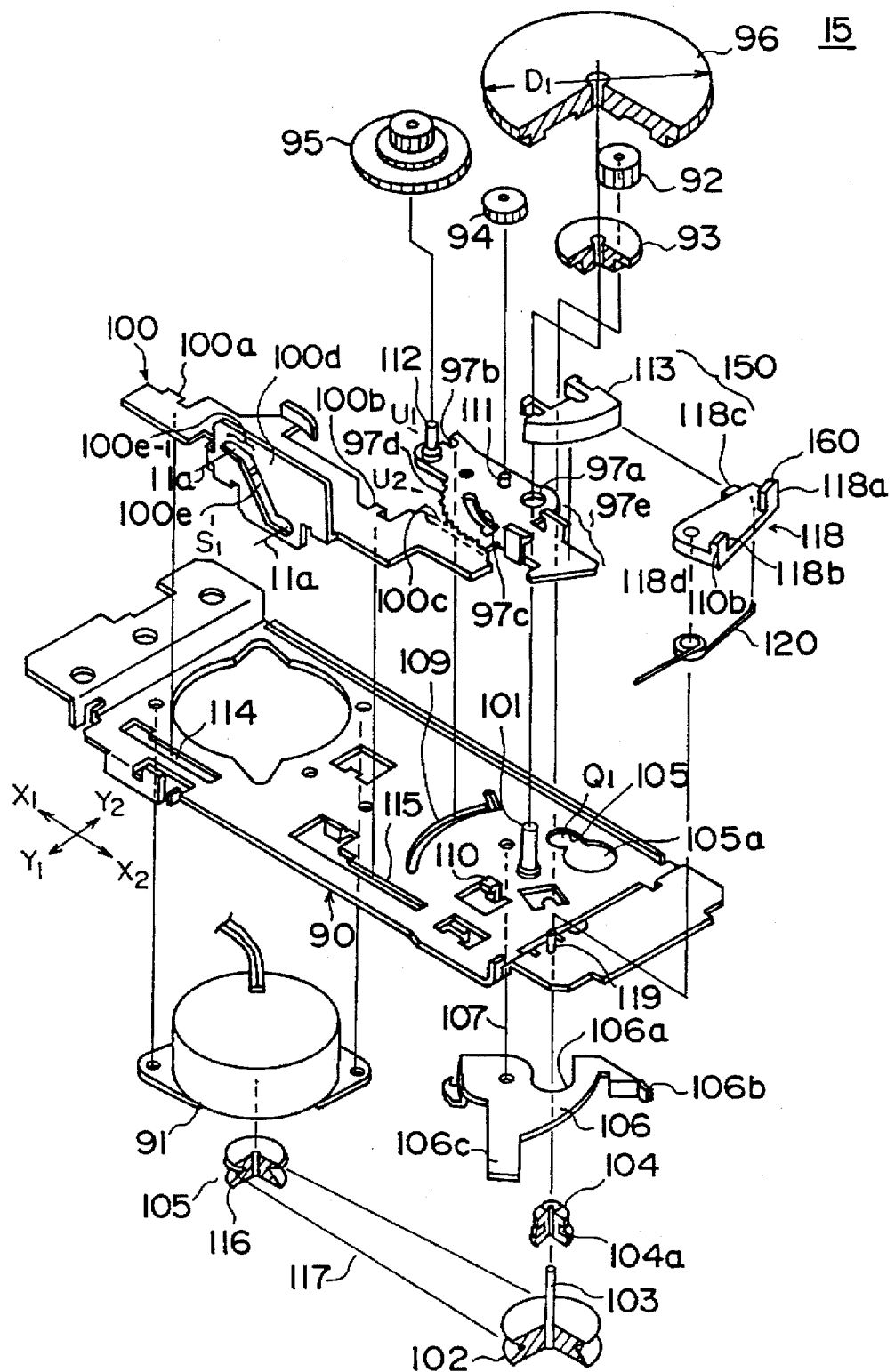
FIG. 7 is a perspective exploded view of the disk loading mechanism in FIG. 6.

The collar 104 is normally pushed forward by the emergency arm 106 so that the collar 104 is fitted onto the slot 105 at a position Q1 indicated in FIG. 7. The edge of the slot 105 is fitted to the groove 104a of the collar 104. The gear 92 at this time is engaged with the gear 93.

The pin 101 is fitted into a hole 97a of the rotating base 97, a connecting portion 97b of the rotating base 97 is connected to the circular slit 109 of the base plate 90, and a projection 110 of the base plate 90 is fitted into a circular slit 97c of the rotating base 97. The rotating base 97 is thus rotatably arranged and the lifting of the rotating base 97 from the base plate 90 is prevented by the projection 110.

The rotating base 97 further includes a gear portion 97d which is formed along a circular line around the hole 97a.

The gear 94 is fitted onto a pin 111 of the rotating base 97, and the gear 95 is fitted into a pin 112 of the rotating base 97.

The gear 94 is engaged with the gear 93 on the rotating base 97, and the gear 95 is engaged with the gears 94 and 96.

An arm guide 113 is attached to a pair of arm guide mounting portions 97e of the rotating base 97.

A pair of connecting portions 100a and 100b of the slider 100 are fitted into a slit 114 and a slit of the base plate 90 respectively. The slider 100 is thus transversely movable relative to the base plate 90 in the directions X1 and X2.

The slider 100 includes a rack portion 100c, and this rack portion is engaged with the gear portion 97d of the rotating base 97.

In addition, the slider 100 includes a raised wall 100d, and a slanting slot 100e is formed in this raised wall 100d.

A belt 117 is wound on a pulley 116 of the motor 91 and on the pulley 102 on the bottom surface of the base plate 90 to transmit a driving force of the motor to the pulley 102.

A tray lock arm 118 includes a pair of projections 118a and 118b, a connecting portion 118c, and a hole 118d. A pin 119 of the base plate 90 is fitted into the hole 118d via a torsion spring 120, and the tray lock arm 118 is mounted on the base plate 90. One end of the torsion spring 120 is connected to the projection 118a, and the tray lock arm 118 is actuated in anticlockwise direction by a biasing force of the torsion spring 120.

The end portions of the base plate 90 are, as shown in FIGS. 1 and 2, secured to the base 12 by screws, and the disk loading unit 15 is arranged within the mounting portion 31 of the base 12 shown in FIG. 5.

It should be noted that the gear 96 is engaged with the toothed surface of the rack 70 of the tray 14. Thus, a rotation of the gear 96 is transmitted to the tray 14 through the engagement, so that the tray 14 is moved by the rotation of the gear 96. Also, it should be noted that the pin 57 of the movable base unit 13 is connected to the slanting slot 100e of the slider 100 of the disk loading mechanism 15. Thus, a movement of the slider 100 in the transversal direction is transmitted to the movable base unit 13 through the connection, so that the movable base unit 13 is vertically rotated from the unsupported position to the disk supported position.

In the CD-ROM system 10 in one embodiment of the present invention, the gear 96 is rotated over 360 degrees (for example, about 1.3 revolutions) which allows the tray 14 to be moved forward or backward from the disk inserting/removing position P1 to the disk loaded position P2 or vice versa. Therefore, a diameter D1 of the gear 96 is about 31 mm, which is smaller than that of the conventional disk apparatus.

For the above-described reason, the disk loading mechanism 15 has a two-dimensional size (the dimensions are indicated by arrows Lx and Ly in FIG. 1) which is remarkably smaller than that of a disk loading mechanism of the conventional disk apparatus.

CLAMPER 16 AND THE RELATED PARTS

As shown in FIGS. 1–3 and 5, a circular plate 130 is secured onto the top of the clamper 16, and the clamper 16 is arranged within a center opening 132 of a clamper holder 131. The clamper 16 is held by a clamper stopper 133 which is secured to the clamper holder 131.

The clamper holder 131 has a rectangular shape, and this clamper holder 131 is arranged onto the raised walls 32 and 33 of the base 12.

FRONT BEZEL 17

As shown in FIG. 5, the front bezel 17 includes a front opening 140, a flap 141 which closes the front opening 140, an emergency hole 142, and a control button 143. The front bezel 17 is mounted to the front of the chassis 11.

OTHERS

The connecting portion 118c of the tray lock arm 118, and the arm guide 113 constitute a rotating base locking mechanism 150 which serves to lock the rotating base 97 at a position U1 shown in FIG. 7.

The projections 118a and 118b of the tray lock arm 118, and the projection 71 of the tray 14 constitute a tray locking mechanism 160 which serves to lock the tray 14 at the disk loaded position P2.

Next, a description will be given of various disk loading operations of the CD-ROM system 10.

As described above, when the disk 26 is inserted prior to the loading of the disk into the CD-ROM system 10, the CD-ROM system 10 is in the initial condition shown in FIG. 8A. The slider 100 at this time is located at a position S1 shown in FIG. 7, the slider 100 having been moved in the direction X1 to this position S1. The rotating base 97 is located at a position U1 shown in FIG. 7 which position is referred to as the first position of the rotating base 97.

Figure 10:
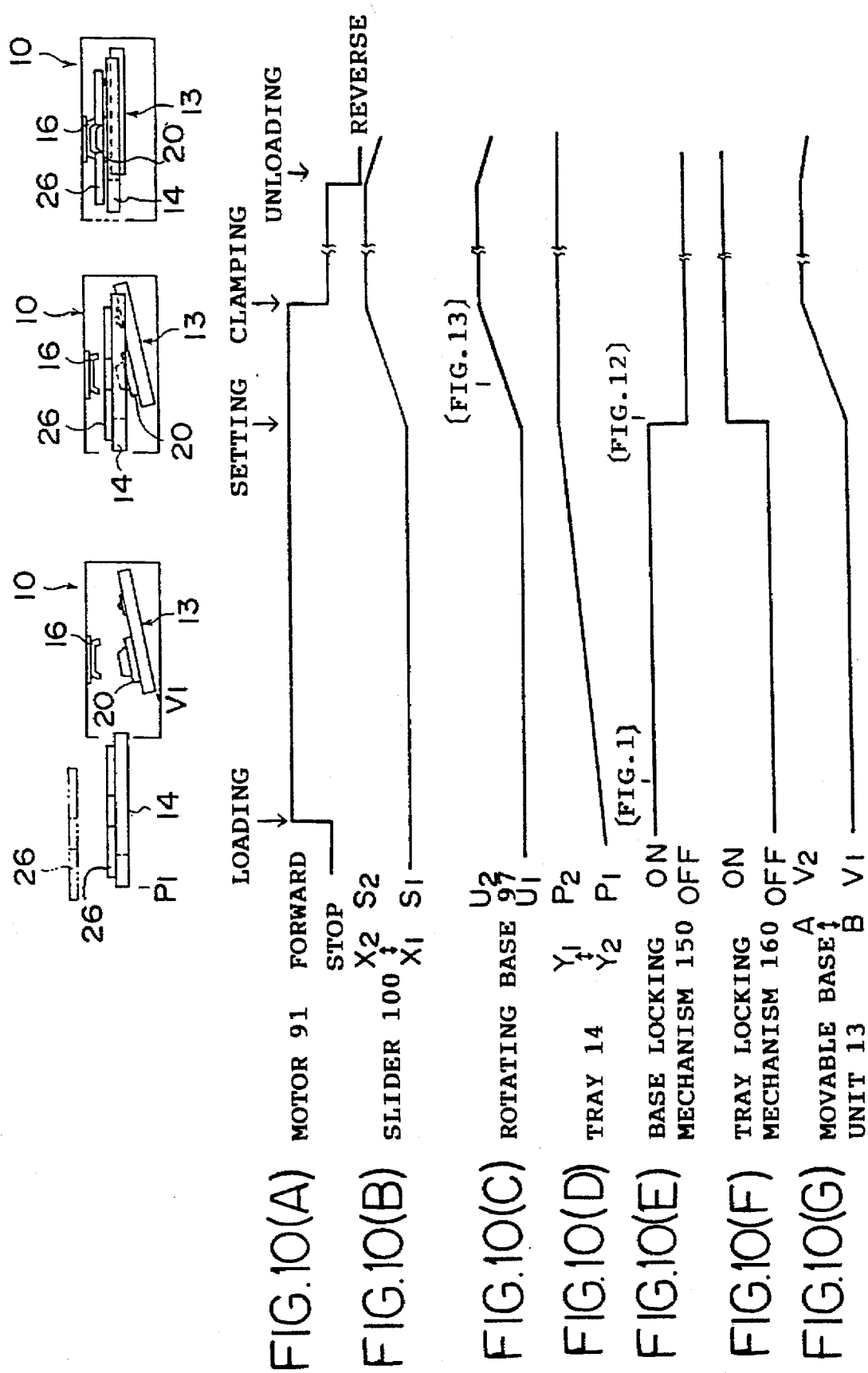
FIG. 10 is a set of time charts for explaining respective operations of the parts of the disk loading mechanism.
Figure 11:
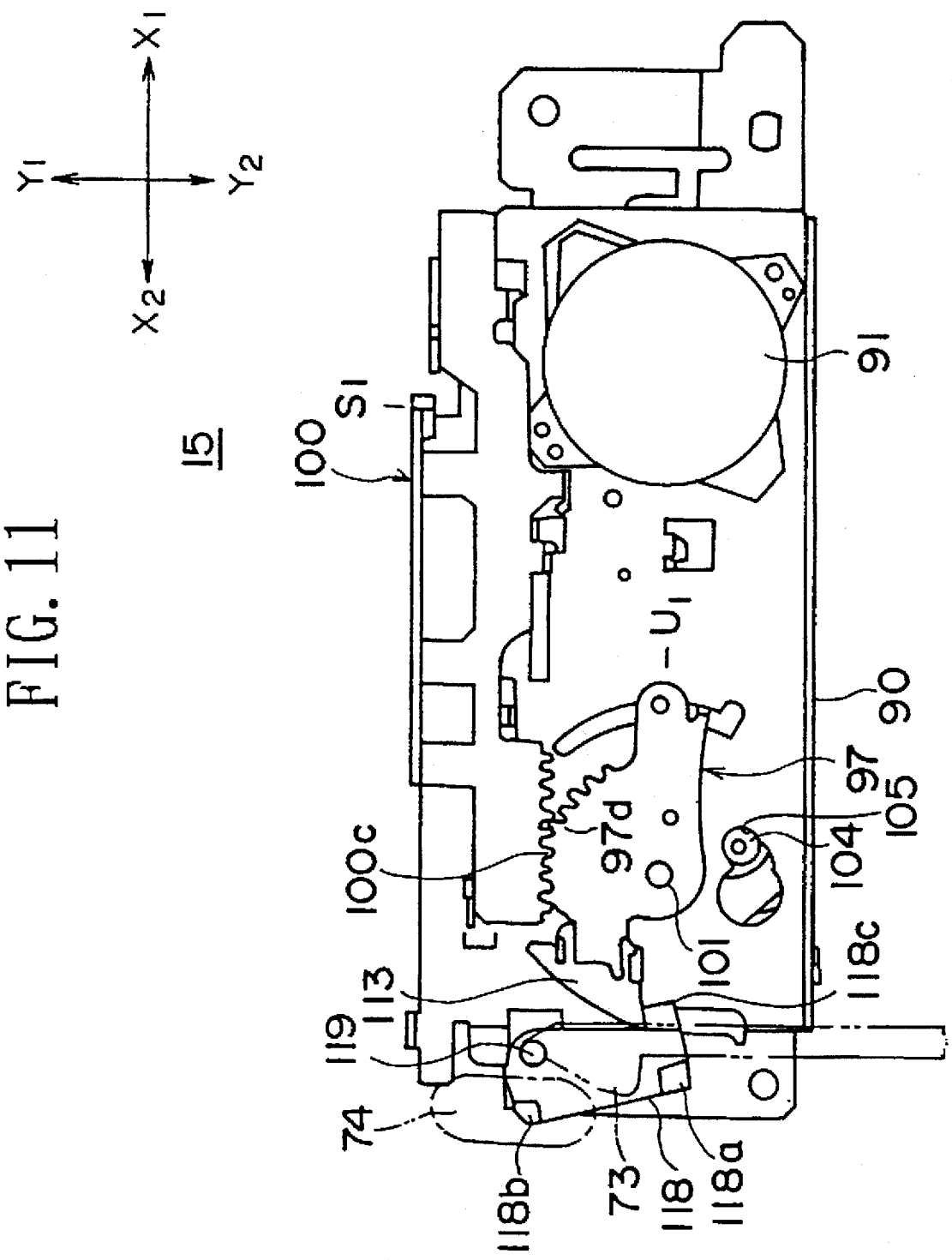
FIG. 11 is a diagram showing an initial condition of the disk loading mechanism when a disk is inserted into the CD-ROM system.

The projection 118c is, as shown in FIG. 11, connected to the arm guide 113, and the rotating base locking mechanism 150 is in the ON state indicated by a time chart (E) of FIG. 10. The rotating base 97 is locked at the position U1 in FIG. 11 by the rotating base locking mechanism 150, and the rotation of the rotating base 97 in anticlockwise direction is prevented.

The tray 14 at this time is located at the disk inserting/removing position P1, and the disk setting portion 60 is projecting from the CD-ROM system 10. The tray locking mechanism 160 is in the OFF state indicated by a time chart (F) of FIG. 10, and the tray 14 is movable in the direction Y1.

The movable base unit 13 at this time is in the downward slanting position V1 shown in FIG. 8A.

Next, the operator places the disk 26 into the disk setting portion 60 of the tray 14 and depresses the control button 143. As indicated by a time chart (A) of FIG. 10, the loading motor 91 starts rotating in a forward direction upon the depression of the control button 143.

The rotating force of the loading motor 91 is transmitted through the belt 117, the pulley 102, and the reduction gear unit, and it is finally transmitted to the gear 96. The gear 96 is rotated clockwise. As the rotating base 97 is locked at this time, the rotating base 97 is held at the position U1.

The rack 70 is moved by the rotation of the gear 96, and the tray 14 is, as indicated by a time chart (D) of FIG. 10, moved in the direction Y1. After the gear 96 is rotated about 1.3 revolutions, the tray 14 is moved to the disk loaded position P2 so that the disk 26 is set within the body 25 of the CD-ROM system 10.

When the tray 14 reaches the disk loaded position P2, the rotating base locking mechanism 150 is switched OFF and the tray locking mechanism 160 is switched ON at the same time.

Next, a description will be given of each of the above switching operations performed when the tray 14 reaches the disk loaded position P2.

Figure 12:
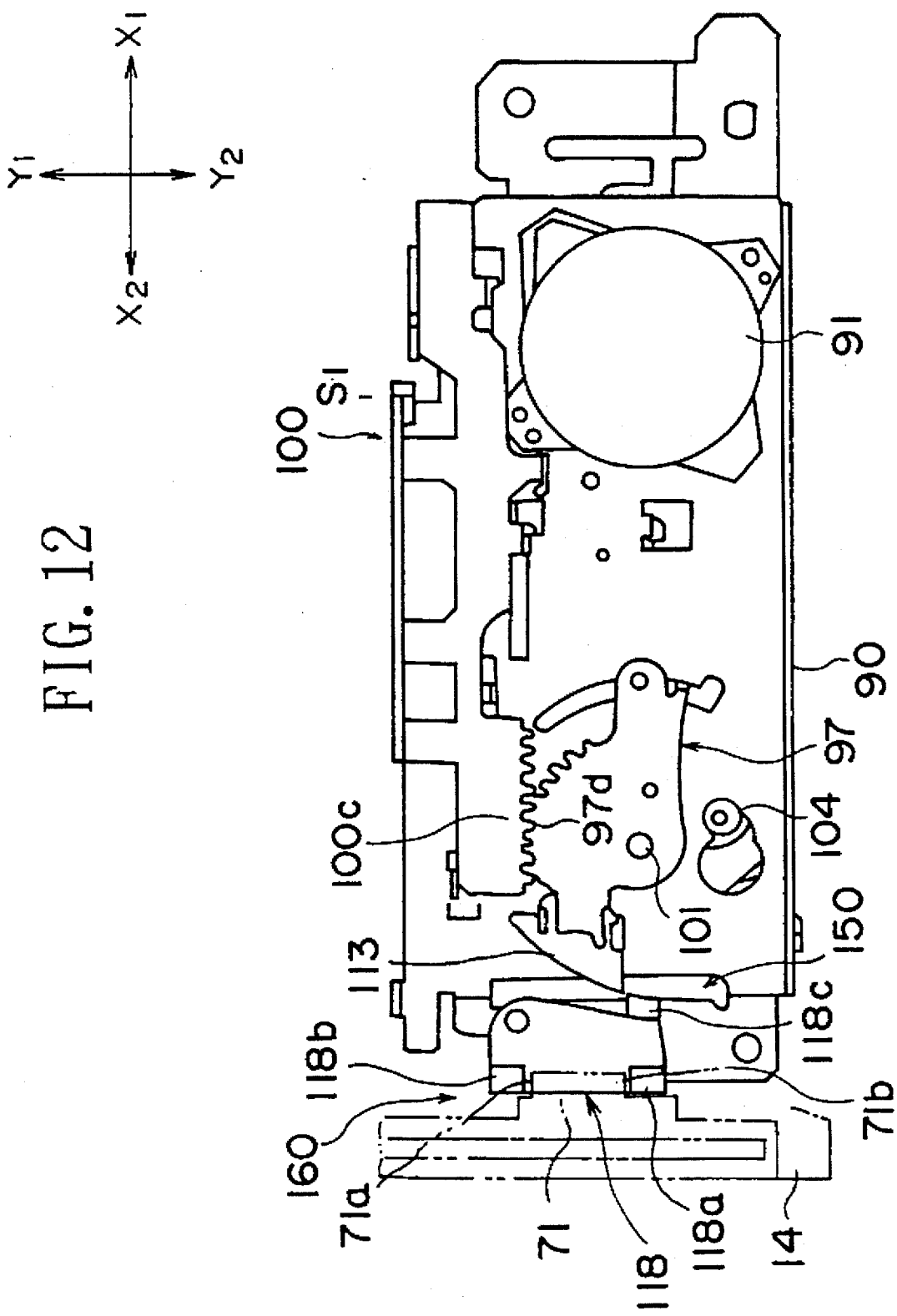
FIG. 12 is a diagram showing a condition of the disk loading mechanism when the tray is moved to a disk loaded position.

(1) As shown in FIG. 12, the projection 71 of the tray 14 is brought into contact with the projection 118b of the tray lock arm 118, and the tray lock arm 118 is pushed by the tray 14 and rotated clockwise against the biasing force of the spring 120.

As a result, the projection 118c is removed from the arm guide 113, and the rotating base locking mechanism 150 is switched OFF as indicated by the time chart (E) of FIG. 10.

(2) As the tray lock arm 118 is rotated clockwise, the projection 71 of the tray 14 is, as shown in FIG. 12, interposed between the projections 118a and 118b of the tray lock arm 118.

As a result, the tray locking mechanism 160 is switched ON as indicated by the time chart (E) of FIG. 10.

When the rotating base locking mechanism 150 is in the OFF state, the rotating base 97 is made rotatable by a movement in a anticlockwise direction.

When the tray locking mechanism 160 is in the ON state, the movement of the tray 14 is restricted and the rotation of the gear 96 is prevented by the tray locking mechanism 160.

Figure 13:
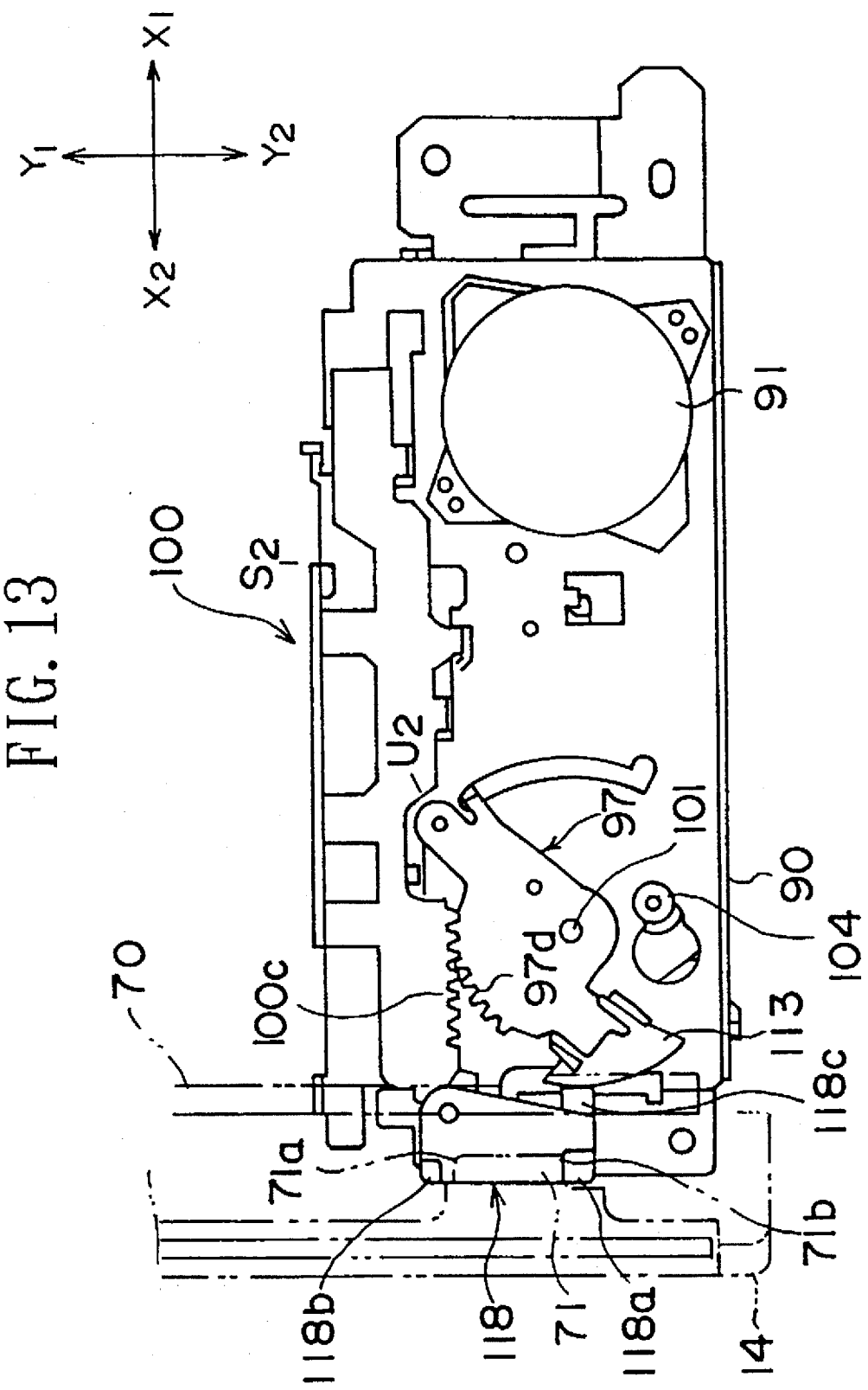
FIG. 13 is a diagram showing a condition of the disk loading mechanism when a movable base is rotated with the tray located at the disk loaded position.

Although the rotation of the gear 96 is stopped, the forward rotation of the loading motor 91 still continues for a while. Thus, the gear 95 is rotated around the periphery of the gear 96. As shown in FIG. 13, the rotating base 97 at this time is rotated anticlockwise.

The rotating base 97 is rotated anticlockwise and moved to the second position U2 shown in FIG. 13. This rotation of the rotating base 97 is indicated by a time chart (C) of FIG. 10. The movement of the rotating base 97 is limited to the range of the circular slit 109.

When the rotating base 97 is rotated anticlockwise, the toothed portion 97d of the rotating base 97 moves the rack 100c of the slider 100. Thus, the slider 100 is transversely moved by the rotating base 97 in the direction X2 to the position S2 shown in FIG. 13. This movement of the slider 100 is indicated by a time chart (B) of FIG. 10.

As the slider 100 is moved to the position S2, the pin 57 is raised along the slanting slot 100e. Thus, the movable base unit 13 is upwardly rotated from the position V1 to the position V2 as indicated by a time chart (G) of FIG. 10. The movement of the pin 57 is guided along the slanting slot 100e, and the pin 57 is brought into contact with a top portion 100e-1 of the slanting slot 100e. The movable base unit 13 is finally rotated to the horizontal position V2.

When the movable base unit 13 reaches the position V2, the disk 26 on the tray 14 is supported on the turn table 20, and the disk 26 is slightly lifted from the disk setting portion 60 of the tray 14.

In addition, the clamper 16 is attracted toward the permanent magnet 20a of the turn table 20, so that the disk 26 is clamped by the clamper 16 onto the turn table 20.

When the disk 26 is clamped by the clamper 16 onto the turn table 20, the slider 100 is located at the position S2 shown in FIG. 13. At this time, a switch 169 shown in FIG. 1 is actuated and the forward rotation of the loading motor 91 is stopped, as indicated by the time chart (A) of FIG. 10.

The disk loading operation of the disk loading mechanism 15 in the CD-ROM system 10 is thus completed. During operation of the CD-ROM system 10, the motor 21 is actuated to rotate the turn table 20, and data is reproduced from the disk 26 on the turn table 20 by using the optical head 22.

Figure 14:
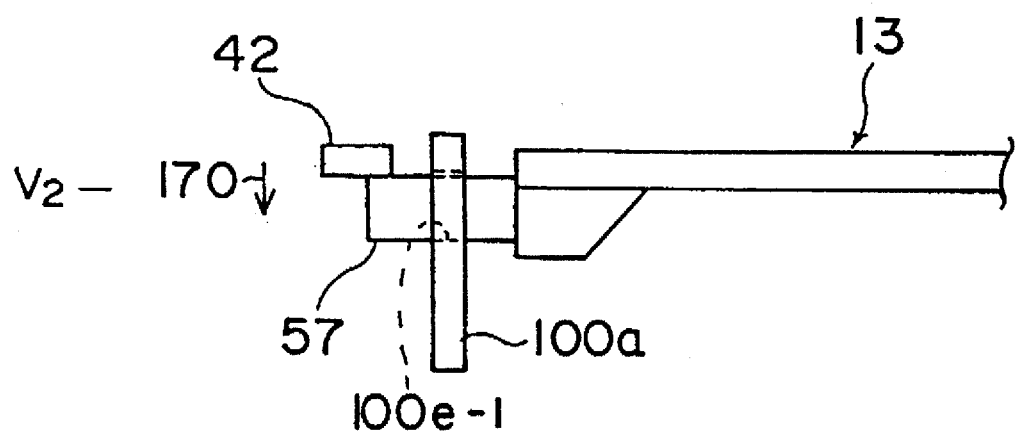
FIG. 14 is a diagram showing a condition of the disk loading mechanism when the movable base is located at a horizontal position.

When the movable base unit 13 is upwardly rotated to the horizontal position V2, the pin 57 is, as shown in FIG. 14, brought into contact with the leaf spring 42. The leading edge of the pin 57 is downwardly pressed by the resilient force of the leaf spring 42 as indicated by an arrow 170 in FIG. 14. A play of the pin 57 relative to the slanting slot 100e is thus eliminated.

Accordingly, the movable base unit 13 can be stably supported with no play of the pin 57 relative to the slanting slot 100e, and it is possible to realize a stable reproduction of the disk 26 by the CD-ROM system 10.

In order to unload the disk 26 from the CD-ROM system 10, the loading motor 91 is rotated in the reverse direction, and a disk unloading operation is generally performed in the reverse sequence to the above-described disk loading operation.

The disk unloading operation related to the disk loading mechanism is carried out as follows.

(1) The rotating base 97 is rotated clockwise, the slider 100 is moved in the direction X1, and the movable base unit 13 is downwardly rotated to the downward slanting position V1. The clamper 16 is released from the disk 26, and the disk 26 is placed onto the disk setting portion 60 of the tray 16.

Figure 15:
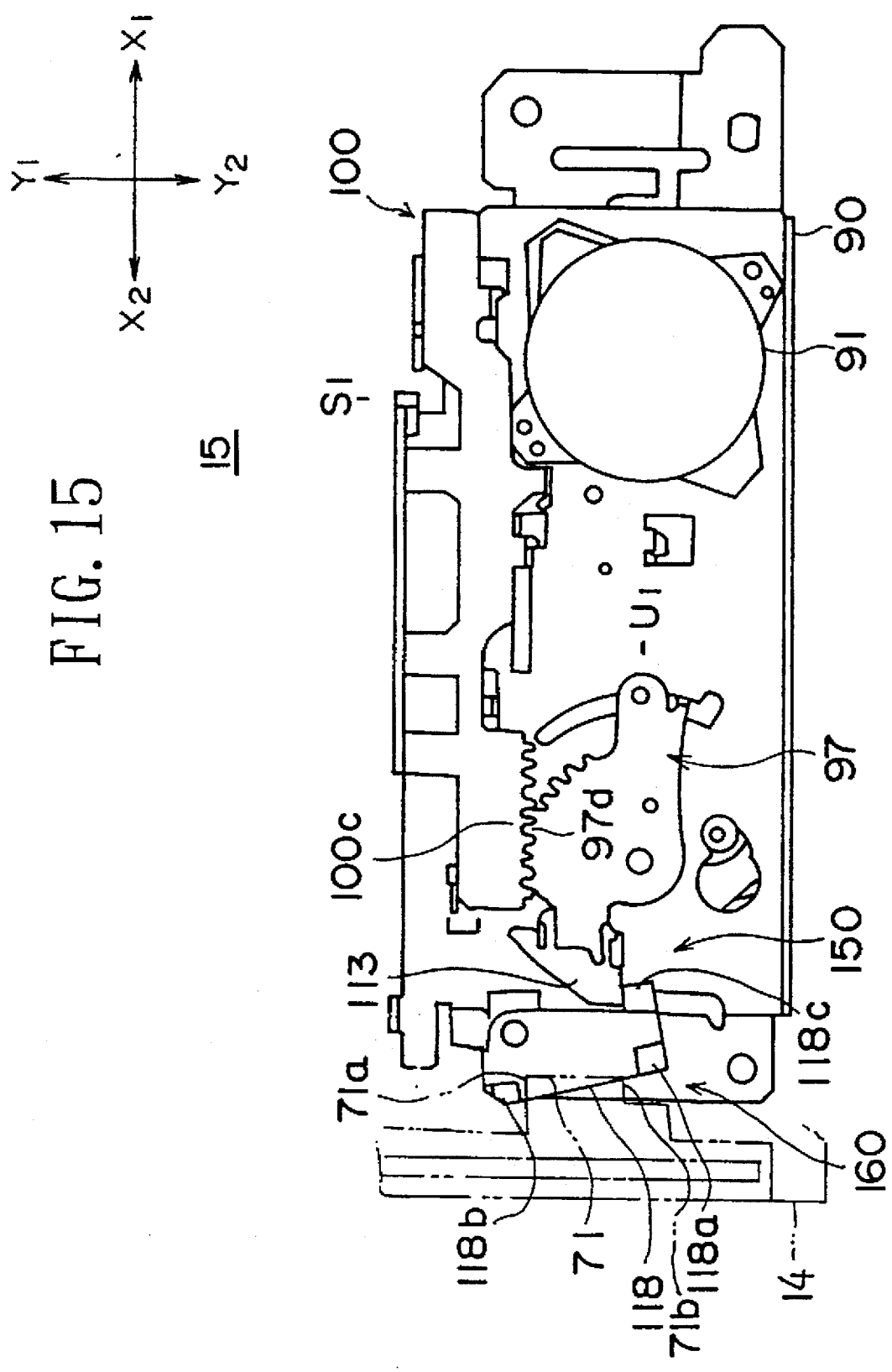
FIG. 15 is a diagram showing a condition of the disk loading mechanism when a disk unloading operation is started.

(2) The rotating base 97 is moved to the position U1, and the tray lock arm 118 is, as shown in FIG. 15, rotated anticlockwise. The rotating base locking mechanism 150 is switched ON and the tray locking mechanism 160 is switched OFF.

(3) The tray 16 is moved forward in the direction Y2 to the disk inserting/removing position P1. As a result, the disk 26 on the tray is ejected from the body 25 of the CD-ROM system 10.

When the tray 14 is moved forward to the position P1, a switch 171, shown in FIG. 1, is pushed by the projection 68 of the tray 14 to stop the rotation of the motor 91.

As shown in FIG. 11, the connecting portion 73 of the tray 14 at this time is connected to the projection 118b to avoid the separation of the tray 14 from the body 25 of the CD-ROM system 10.

If necessary, the cover plate is removed from the body 25 of the CD-ROM system 10 and a screwdriver may be inserted into the hole 74 to push the projection 118b. This allows the tray lock arm 118 to be rotated clockwise. The connecting portion 73 is disconnected from the projection 118b of the tray lock arm 118, and the tray 14 can be separated from the body 25 of the CD-ROM system 10.

Next, a description will be given of an emergency unloading mechanism of the CD-ROM system in one embodiment of the present invention.

Figure 16:
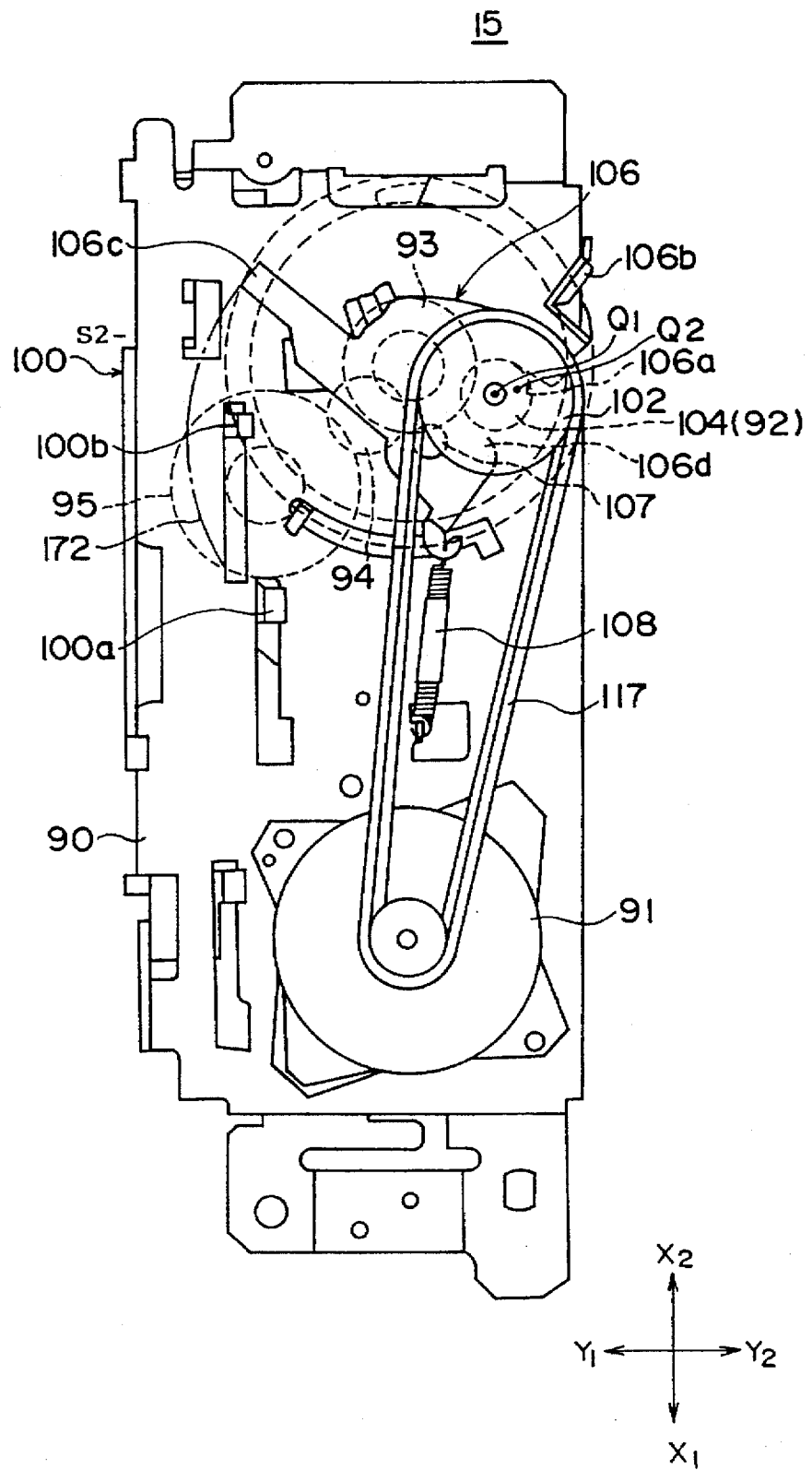
FIG. 16 is a bottom view of the disk loading mechanism when it is in a normal condition.
Figure 17:
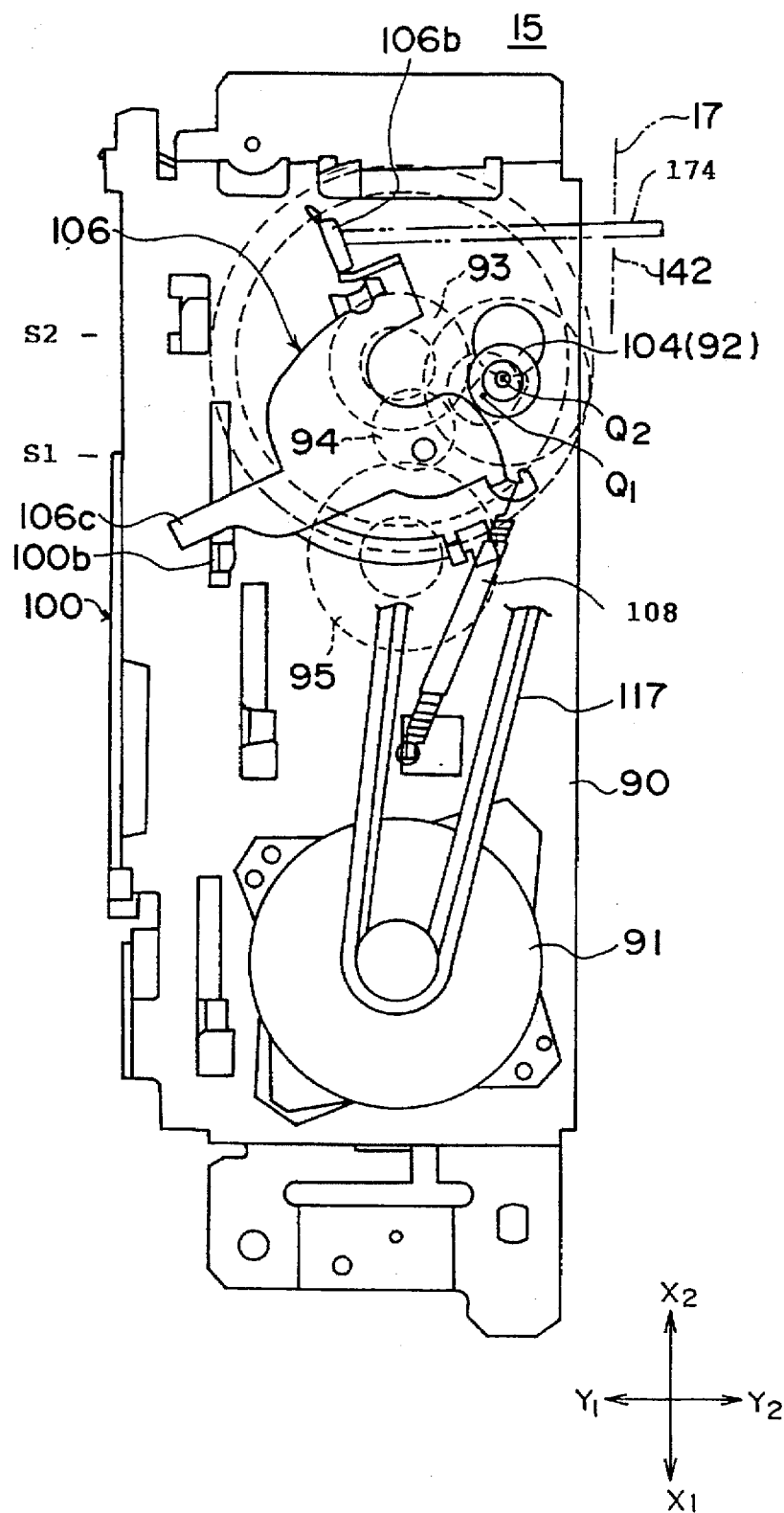
FIG. 17 is a bottom view of the disk loading mechanism when an emergency unloading operation is performed.

FIG. 16 shows the bottom surface of the disk loading mechanism 15 in a normal condition, and FIG. 17 shows the bottom surface of the disk loading mechanism 15 when an emergency unloading operation is performed.

As shown in FIGS. 16 and 17, the emergency arm 106 includes the U-shaped edge 106a, an arm portion 106b, an arm portion 106c, and a shoulder portion 106d. The arm portion 106b is located at a position beneath the emergency hole 142 of the front bezel 17. The shoulder portion 106d is formed at a corner of the U-shaped edge 106a. The arm portion 106c is arranged such that the connecting portion 100b lies within a rotation circle (indicated by a one-dot chain line in FIG. 16) drawn by the end of the arm portion 106c when the emergency arm 106 is rotated around the pin 107.

When the tray 14 is moved in the direction Y1 to the disk loaded position P2, the raised wall 39a of the tray pushing plate 39 is pushed by the projection 173 of the bottom surface of the tray 14 in the direction Y1. The movement of the tray pushing plate 39 in the direction Y1 at this time is indicated by an arrow a in FIG. 1.

The tray 14 at this time is moved in the direction Y2 by the biasing force of the spring 40.

In order to perform the emergency unloading operation, it is necessary that the operator manually inserts a rod member 174, shown in FIG. 1, into the emergency hole 142 of the front bezel 17.

The arm portion 106b of the emergency arm 106 is pushed by the rod member 174, and the emergency arm 106 is rotated against the biasing force of the spring 108. This rotation of the emergency arm 106 is made in the clockwise direction in FIG. 7 but in the anticlockwise direction in FIG. 16. As the result of this rotation, the emergency arm 106 is moved to the position shown in FIG. 17.

As the result of the rotation of the emergency arm 106, the following two operations are carried out:

(1) The collar 104 is pushed by the shoulder portion 106d of the emergency arm 106, and the collar 104 is moved from the position Q1 of the slot 105 to a position Q2 shown in FIG. 17. As a result, the gear 92 which is coaxially arranged with the collar 104 is separated from the gear 93. The engagement between the gear 92 and the gear 93 is thus canceled.

When the collar 104 is moved from the position Q1 to the position Q2, the belt 117 is slightly expanded.

(2) The arm portion 106c is connected to the connecting portion 100b of the slider 100, and the slider 100 is pushed by the emergency arm 106. As a result, the slider 100 is transversely moved in the direction X1 from the position S2 to the position S1.

This movement of the slider 100 allows the following two operations to be performed.

Figure 3:
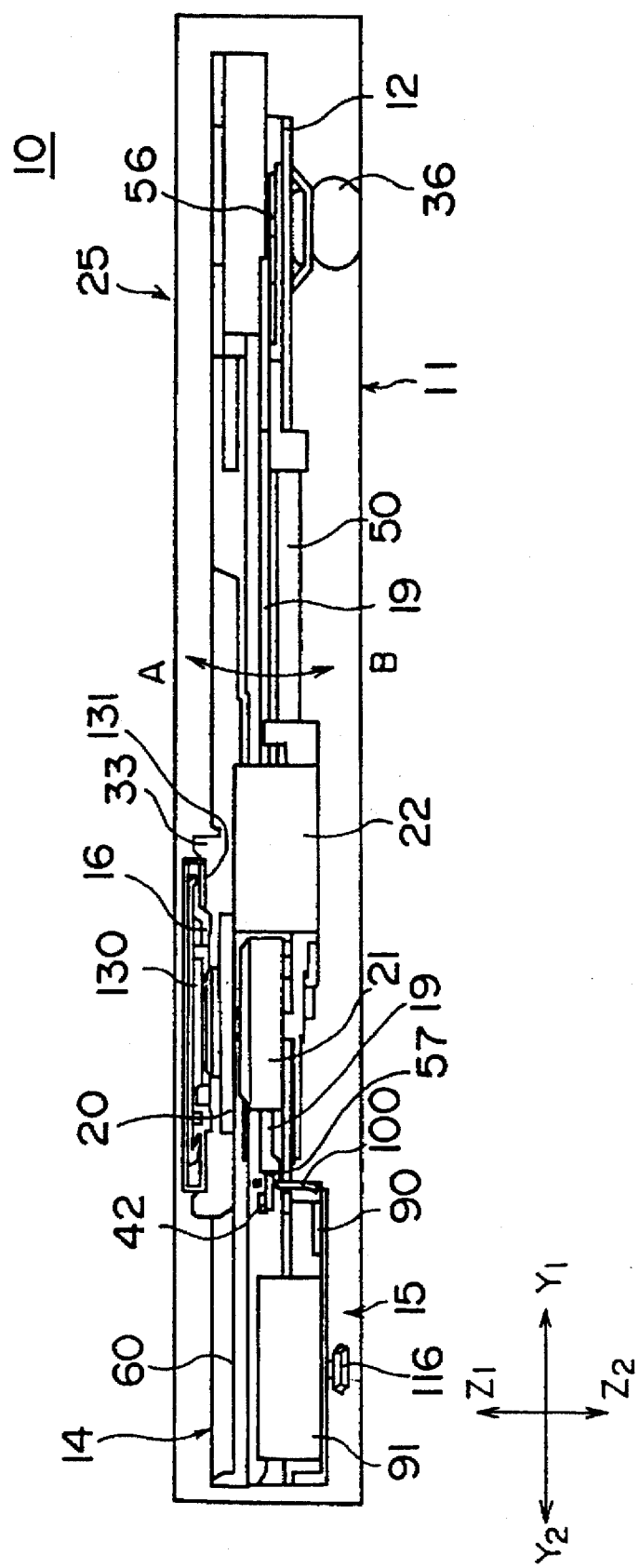
FIG. 3 is a cross-sectional view of the CD-ROM system taken along a line III—III in FIG. 1.
Figure 4:
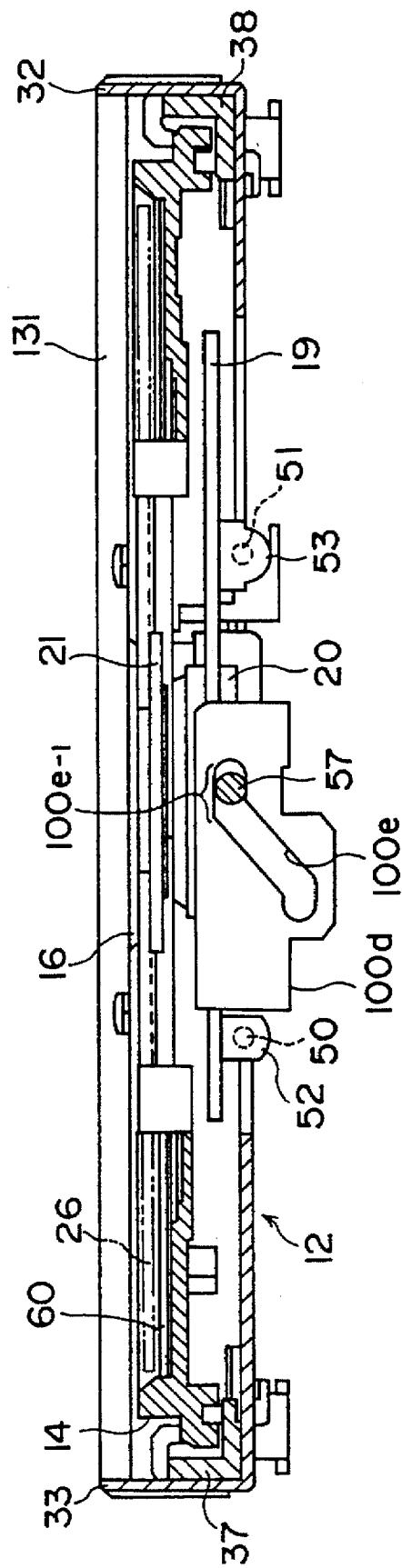
FIG. 4 is a cross-sectional view of the CD-ROM system taken along a line IV—IV in FIG. 1.

The movable base unit 13 is downwardly rotated to the downward slanting position V1 as indicated by the arrow B in FIG. 3. The turn table 20 is lowered and the clamper 16 is removed from the disk 26. The disk 26 is thus supported on the disk setting portion 60 of the tray 14.

When the slider 100 is moved in the direction X1 from the position S2 to the position S1, the rotating base 97 is, as shown in FIG. 15, rotated clockwise to the position U1. The tray lock arm 118 is rotated anticlockwise by the biasing force of the spring 120, and the projection 118a is disconnected from the contact portion 71b so that the tray locking mechanism 160 is switched OFF.

As the locking of the tray 14 by the tray locking mechanism 160 is canceled, the tray 14 is pushed by the biasing force of the spring 40 through the tray pushing plate 39. The tray 14 is thus moved in the direction Y2 by a distance indicated by the arrow a in FIG. 1, thus projecting from the body 25 of the CD-ROM system 10.

The operator can slightly pull the tray 14, and the tray 14 is further moved in the direction Y2. The disk 26 on the tray 14 is thus ejected from the CD-ROM system 10 by performing the emergency unloading operation.

While the tray 14 is moved in the direction Y2 by the biasing force of the spring 40, the gear 96 is rotated by the movement of the rack 70.

In the above embodiment of the present invention, when the emergency unloading operation is performed, the engagement between the gear 92 and the gear 93 is canceled. It should be noted that the CD-ROM system 10 in one embodiment of the present invention has the following advantages.

(1) It is possible to reduce the force needed for the operator to insert the rod member 174 into the hole 142 in order to perform the emergency unloading operation.

When the rotating base 97 is rotated from the position U2 to the position U1, the gear 95 is rotated around the periphery of the gear 96. This rotation of the gear 95 is transferred to the gear 94 and the gear 93. However, the engagement of the gear 93 with the gear 92 is canceled. The rotation of the gear 93 is not transferred to the gear 92. Thus, the rotation of the gear 95 is not transmitted to the loading motor 91 which is in the stop condition at this time. This allows the load of the loading motor 91 in the stop condition not to be related to the rotation of the gear 95. Therefore, the force needed to rotate the rotating base 97 to the position U1 when the emergency unloading operation is performed on the CD-ROM system 10 of the present invention can remarkably be reduced from that of the conventional device in which the rotating base must be rotated to such a position by driving the loading motor.

Thus, it is possible to remarkably reduce the force needed for the operator to insert the rod member 174, which allows a smooth emergency unloading operation.

(2) It is possible to stabilize the ejecting movement of the tray 14 even if the spring 40 has a small biasing force.

While the tray 14 is moved in the direction Y2 to unload the disk 26 from the CD-ROM system 10, the gear 96 is rotated by the movement of the rack 70. The rotation of the gear 96 is not transferred to the loading motor 91, and the force needed to rotate the gear 96 at this time can effectively be reduced. Therefore, the ejecting movement of the tray 14 at the time of the emergency unloading operation can stably be carried out even if the spring 40 has a small biasing force.

(3) It is possible for the operator to easily pull out the tray 14 from the CD-ROM system 10 with a small force.

As described in the above item (2), the force needed to rotate the gear 96 at the time of the emergency unloading operation can effectively be reduced. The tray 14 can easily be pulled out from the CD-ROM system with a small force.

The operator removes the rod member 174 after the tray 14 is pulled out. If the rod member 174 is removed, the emergency arm 106 is rotated by the biasing force of the spring 108 and it returns back to the original position shown in FIG. 16.

As shown in FIG. 16, the shoulder portion 106d is separated from the collar 104, and the collar 104 returns back to the original position Q1 by the tensile force of the belt 117. Also, the gear 92 which is coaxially arranged with the collar 104 approaches the gear 93, and the gear 92 is engaged with the gear 93 again.

The engagement between the gear 92 and the gear 93 can readily be performed because the gear 93 starts the rotation as soon as the loading motor 91 starts rotating.

Next, a description will be given of a mounting portion of the clamper holder 131 by referring to FIGS. 18 through 21C.

Figure 18:
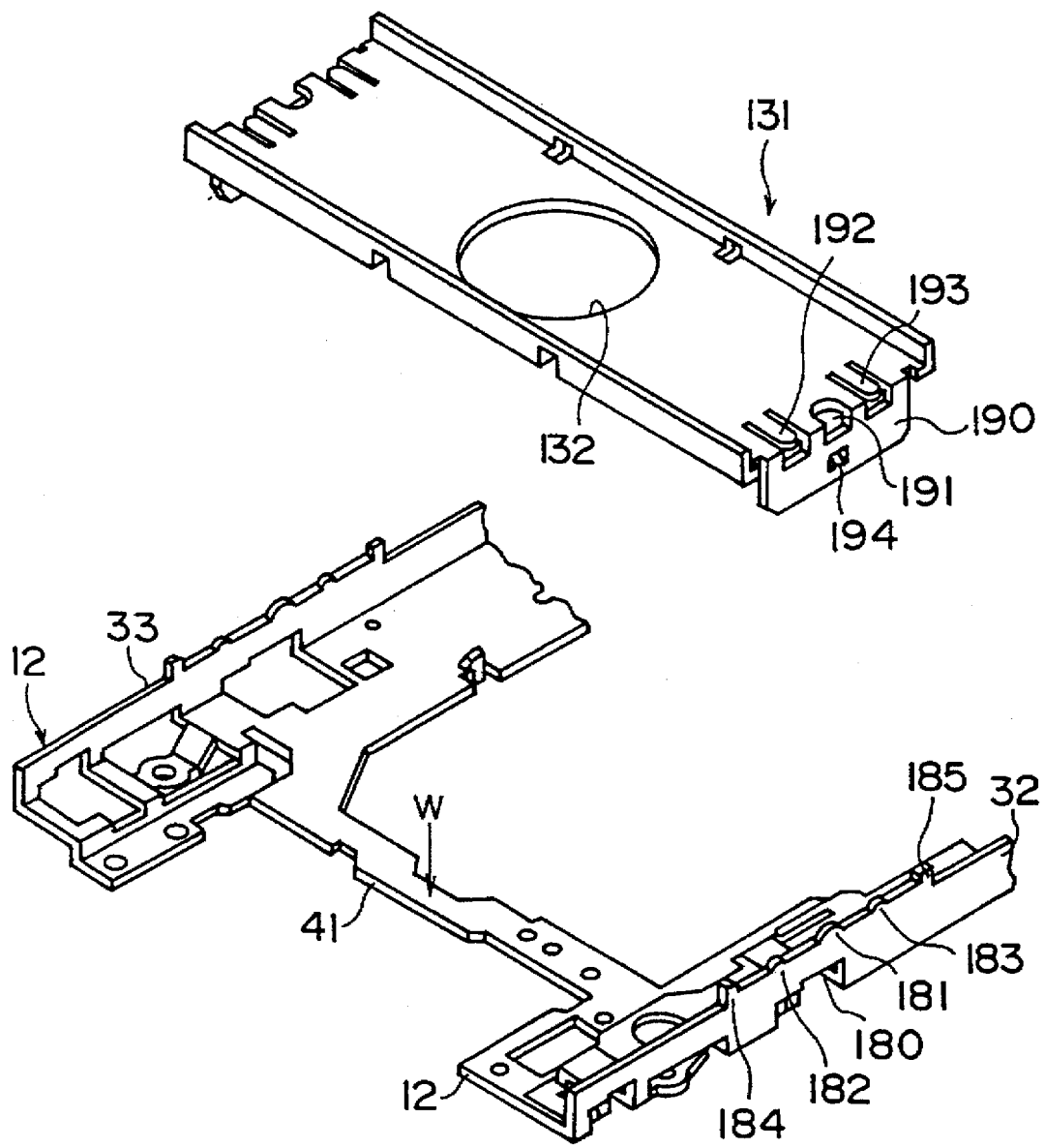
FIG. 18 is a perspective view of a clamper holder and the movable base of the disk loading mechanism in FIG. 5.

As shown in FIG. 18, the base 12 includes a cut-out opening 180 at one side middle portion thereof, and a set of rounded projections 181 through 183 on the top of the raised wall 32 and a pair of projections 184 and 185 thereon. Also, the base 12 includes a cut-out opening at the other side middle portion thereof, and a set of rounded projections on the top of the raised wall 33 and a pair of projections thereon.

The clamper holder 131 includes a bent flange portion 190 at one side thereof and an opening 191 at a side middle portion thereof. The clamper holder 131 includes a pair of cut-out portions 192 and 193 at both sides of the opening 191, and a cut-out projection 194 in the flange portion 190. The cut-out portions 192 and 193 are resiliently deformable. The cut-out projection 194 is inwardly raised from the inside of the flange portion 190. Also, the clamper holder 131 includes a bent flange portion at the other side thereof, an opening at the other side middle portion thereof, a pair of cut-out portions at both sides of the opening, and a cut-out projection in the flange portion.

Figure 19:
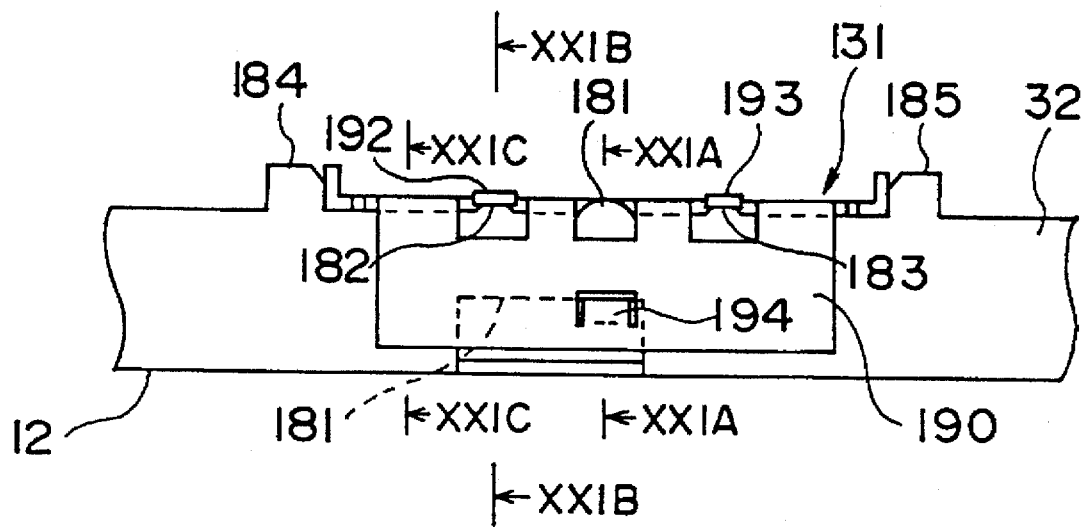
FIG. 19 is a front view of a mounting portion of the clamper holder.
Figure 20:
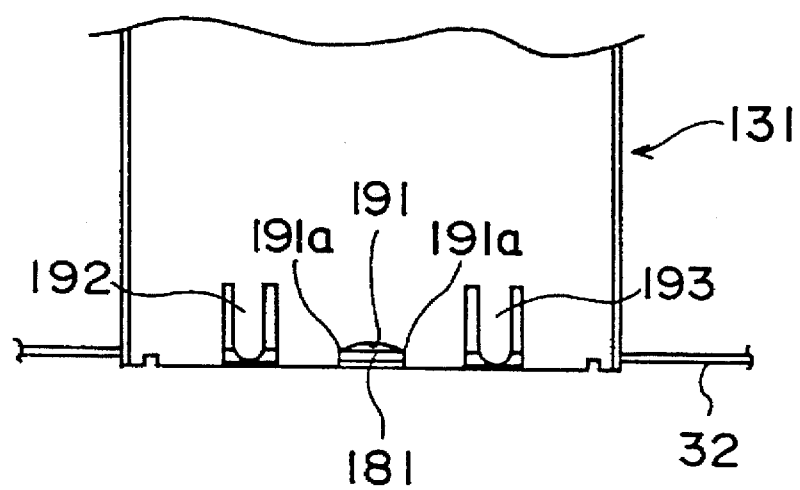
FIG. 20 is a plan view of the mounting portion of the clamper holder.

The clamper holder 131 is fixed to the base 12 by pressing downwardly onto the base 12. As shown in FIGS. 19 and 20, one end of the clamper holder 131 are fitted between the projections 184 and 185 of the base 12, the flange 190 of the clamper holder 131 is placed on the outside of the raised wall 32, the projection 194 is connected to the cut-out portion 180, and the cut-out portions 192 and 193 are connected to the outside of the raised wall 32. For the other end of the clamper holder 131, the mounting portion of the clamper holder 131 has the same construction as described above.

The cut-out projection 194 of the flange holder 131 is, as shown in FIG. 21A, connected to the cut-out portion 180 of the base 12.

The cut-out portions 192 and 193 are, as shown in FIG. 21B, pressed onto the rounded projections 182 and 183 of the base 12 by resiliently deforming the cut-out portions 192 and 193.

As shown in FIG. 21C, there is a space 195 between the top of the raised wall 32 and the clamper holder 131.

Accordingly, the clamper holder 131 clamps the raised wall 32 of the base 12 by using the projection 194 and the cut-out portions 192 and 193.

In addition, as shown in FIGS. 20 and 21A, the rounded projection 181 is fitted into the opening 191, and the projection 181 is brought into contact with the edge 191a of the opening 191.

Thus, the mounting portion of the clamper holder 131 makes it possible to prevent the inward deformation of the raised wall 32 of the base 12, as indicated by two-dot chain lines in FIG. 21A, even when a downward force W in FIG. 21A acts on the transversal bar portion 41 of the base 12 to resiliently deform the base 12 downward. Therefore, it is possible to prevent the cut-out portion 180 from being separated from the cut-out projection 194 of the clamper holder 131 due to the resilient deformation.

Next, a description will be given of mounting portions of the tray guide members 37 and 38 by referring to FIGS. 22 through 26C. The mounting portions of the tray guide members 37 and 38 are symmetrical and have the same construction. For the sake of convenience, only a description of the mounting portion of the tray guide member 37 will be given.

Figure 22:
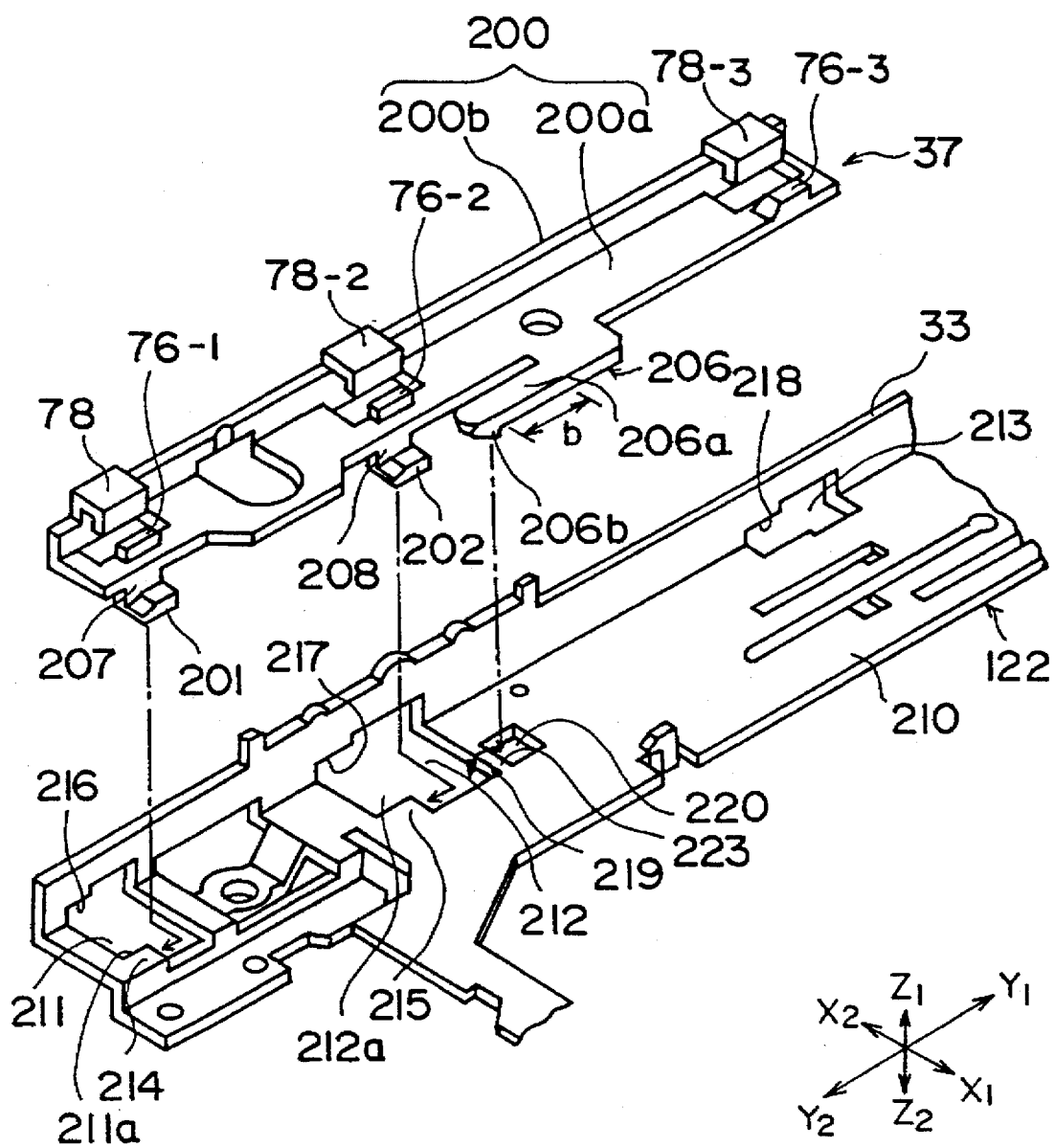
FIG. 22 is a perspective view of one guide member and the movable base of the disk loading mechanism in FIG. 5.
Figure 23:
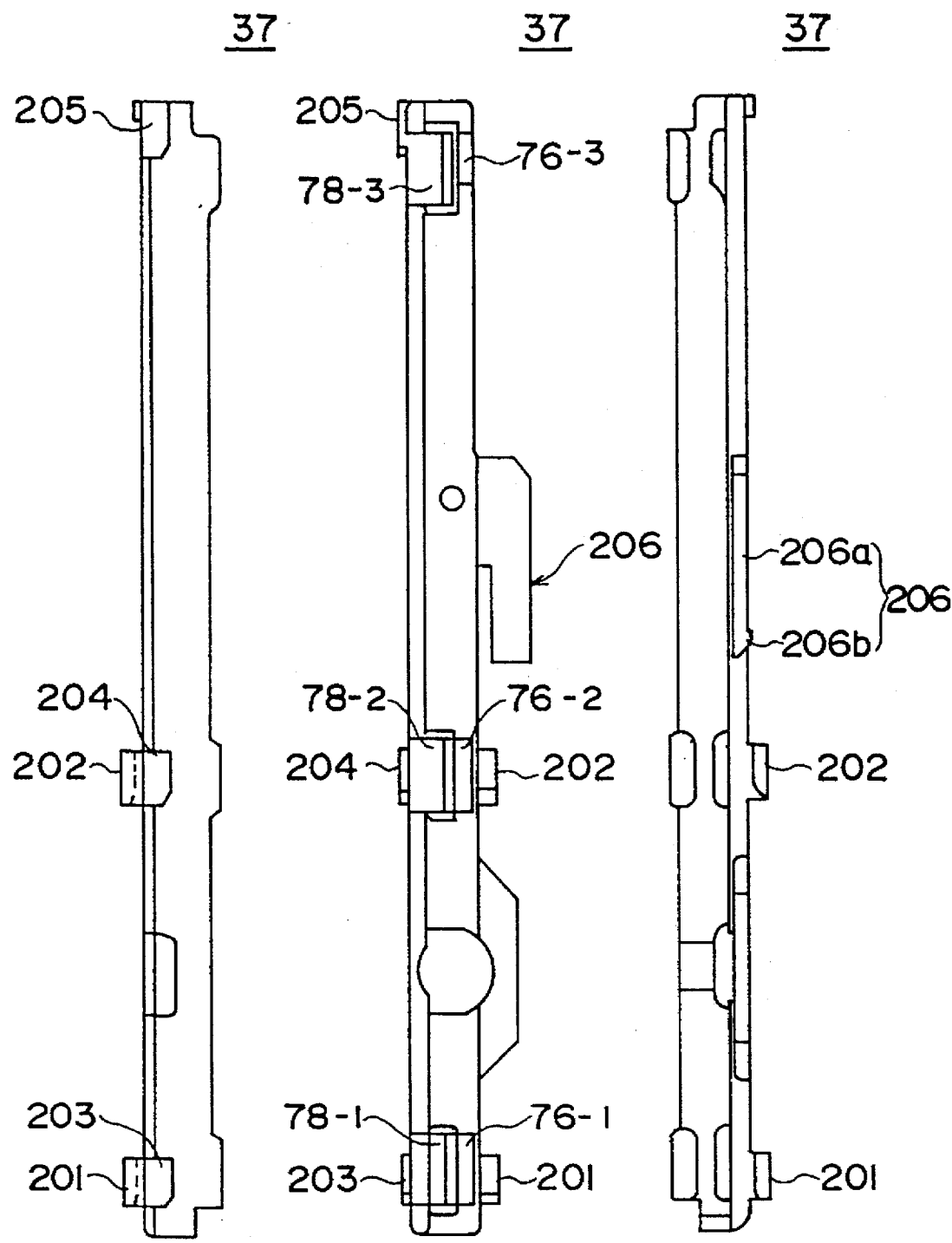
FIGS. 23A, 23B and 23C are a left side view, a front view and a right side view of the tray guide member in FIG. 22.
Figure 24:
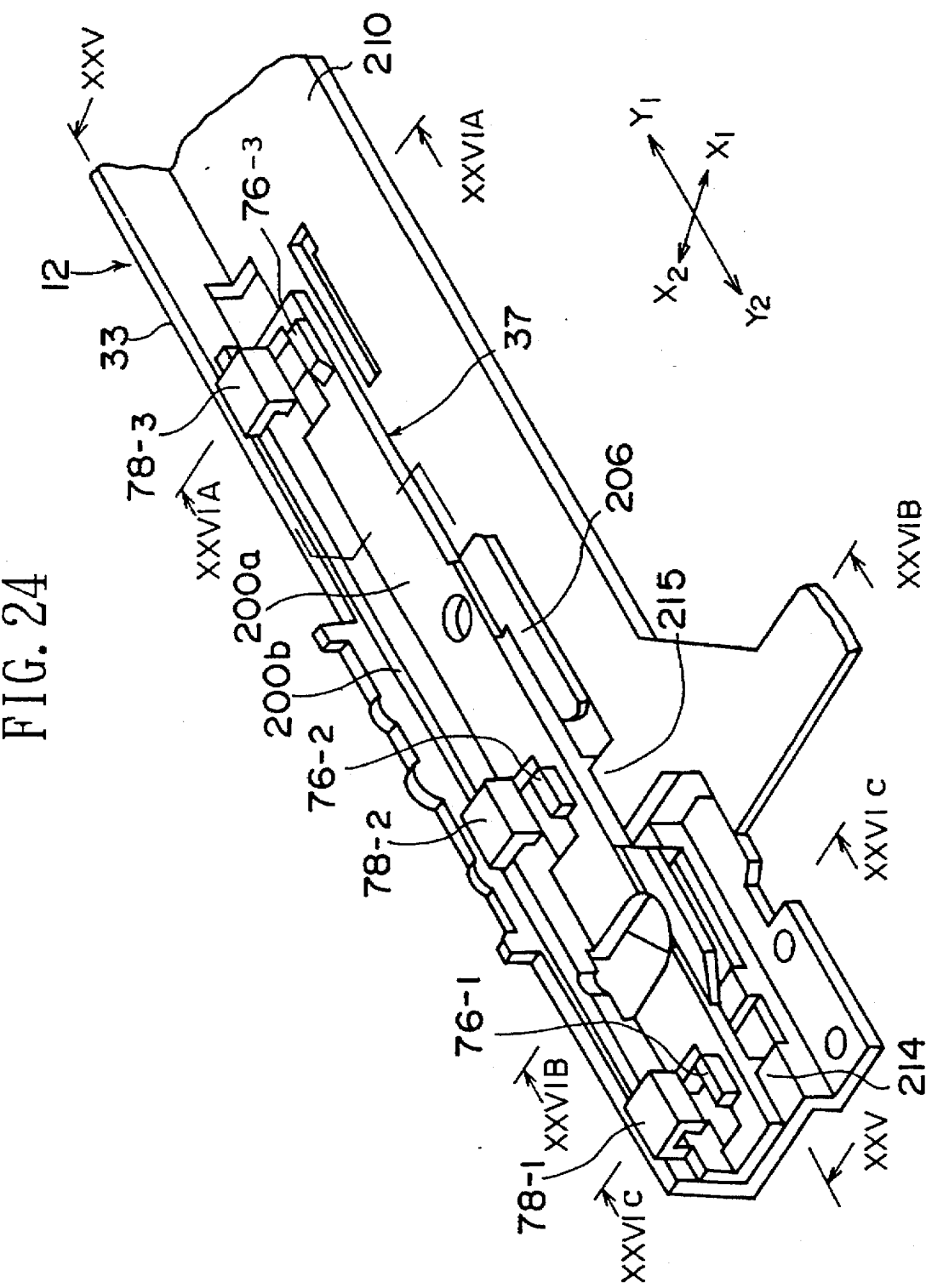
FIG. 24 is a perspective view of a mounting portion of one guide member.
Figure 25:
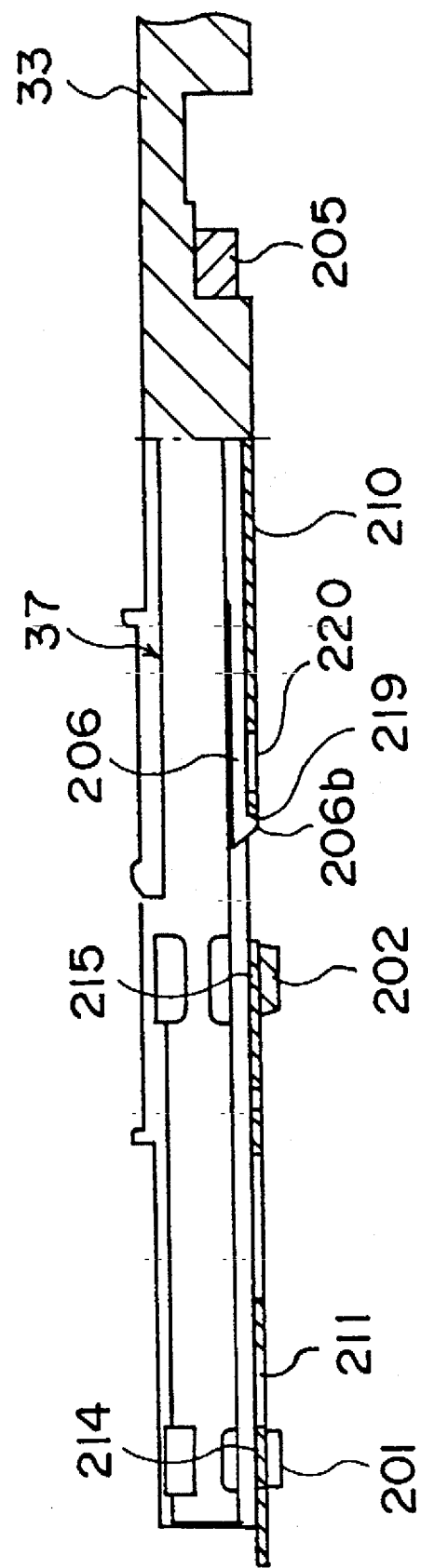
FIG. 25 is a longitudinal cross-sectional view of the mounting portion of the tray guide member taken along a line XXV—XXV in FIG. 24.
Figure 26A:
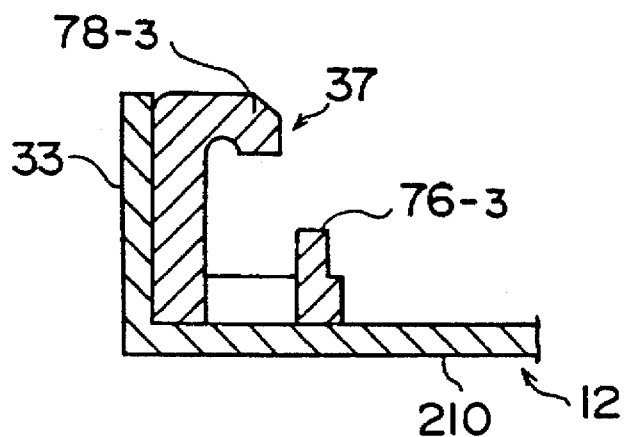
FIGS. 26A, 26B and 26C are transversal cross-sectional views of the mounting portion of the tray guide member.
Figure 26B:
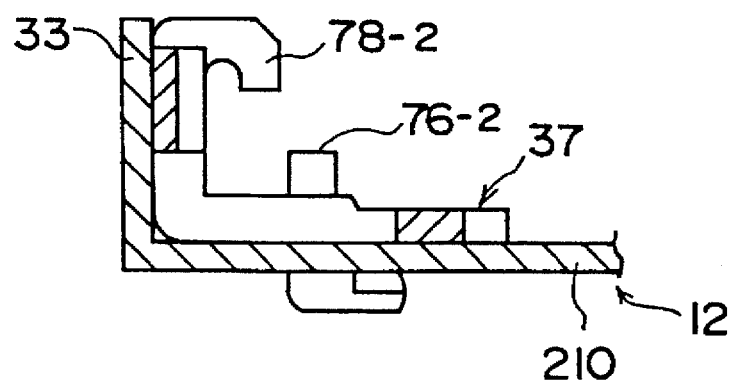
Figure 26C:
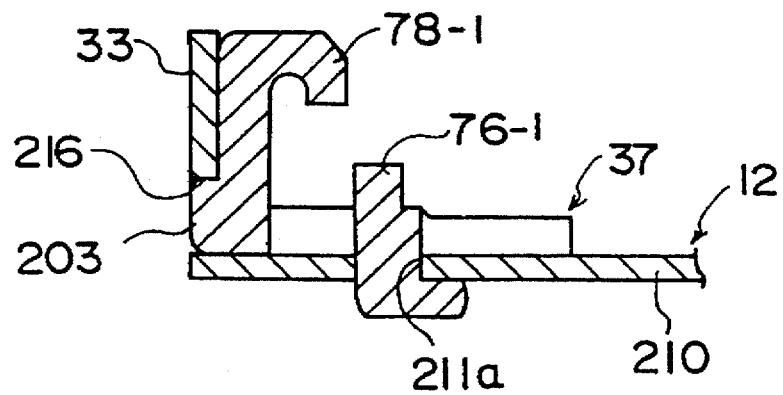

As shown in FIGS. 22 and 23, the tray guide member 37 includes a longitudinally extending body 200 and three projections 76-1, 76-2 and 76-3. These projections are spaced from each other in the longitudinal direction on the body 200. The body 200 has an L-shaped cross-section and the body is composed of a base portion 200a and a raised wall 200b.

Retaining portions 78-1, 78-2 and 78-3 which are respectively located at positions corresponding to the projections 76-1, 76-2 and 76-3 are formed on the top of the raised wall 200b.

The tray guide member 37 further includes two connecting portions 201 and 202 which are respectively located at positions corresponding to the projections 76-1 and 76-2 are formed on one side of the base portion 200a. As shown in FIG. 22, each of the connecting portions transversely projects from the side of the base portion 200a.

As shown in FIGS. 23A through 23C, the tray guide member 37 further includes three step portions 203, 204 and 205 which are respectively formed on the projections 76-1, 76-2 and 76-3. Each of the step portions 203 through 205 transversely projects from the raised wall 200b.

The tray guide member 37 further includes a hook portion 206. This hook portion 206 is provided on the base portion 200a between the projections 76-2 and 76-3. The hook portion 206 includes a longitudinally extending arm 206a and a downwardly projecting portion 206b at the leading edge of the arm 206a. The arm 206a of the hook portion 206 has a relatively large length indicated by an arrow b in FIG. 22. The arm 206a is resiliently deformable in the vertical direction.

As shown in FIG. 22, the base 12 includes a surface portion 210 and the raised wall 33. The base 12 includes three openings 211, 212 and 213 which are spaced from each other in the longitudinal direction on the surface portion 210. The openings 211, 212 and 213 are located at positions corresponding to the projections 76-1, 76-2 and 76-3 of the tray guide member 37.

The surface portion 210 of the base 12 includes extended portions 214 and 215 which are respectively arranged at the edges of the opening 211 and 212. The extended portions 214 and 215 are located at positions corresponding to the connecting portions 201 and 202 of the tray guide member 37. The raised wall 33 of the base 12 includes cut-out portions 216, 217 and 218 which are respectively arranged at the edges of the openings 211, 212 and 213.

The surface portion 210 of the base 12 includes a small rectangular opening 220 in the vicinity of an edge portion 219 of the opening 212.

The above-described tray guide member 37 is attached to the base 12 by setting it onto the base 12 in the downward vertical direction. The connecting portions 201 and 202 are fitted into the openings 211 and 212. The step portions 203 through 205 are fitted into the openings 211 through 213. The downwardly projecting portion 206b is fitted onto the rectangular opening 220. The bottom of the base portion 200a of the tray guide member 37 is completely in contact with the top of the base portion 210 of the base 12. The raised wall 200b of the tray guide member 37 is brought into contact with the inside of the raised wall 33 of the base 12.

After the tray guide member 37 is attached to the base 12 in the above-described manner, the tray guide member 37 is slightly moved in the direction Y2 relative to the base 12, so that the tray guide member 37 is mounted on the base 12 as shown in FIGS. 24, 25 and 26A through 26C.

After the tray guide member 37 is mounted on the base 12, the connecting portions 201 and 202 are set beneath the extended portions 214 and 215. The step portions 203, 204 and 205 are fitted to the cut-out portions 216, 217 and 218. The tray guide member 37 is firmly pressed against the surface portion 210 of the base 12 with the help of the connecting portions 201 and 202 and the step portions 203, 204 and 205. The movement of the tray guide member 37 relative to the base 12 in the direction Y2 after the tray guide member 37 is mounted on the base 12 is prevented.

The downwardly projecting portion 206b, when the tray guide member 37 is slightly moved in the direction Y2 relative to the base 12, is separated from the rectangular opening 220 and fitted into the opening 212. The downwardly projecting portion 206b is connected by the edge portion 219, and the movement of the tray guide member 37 relative to the base 12 in the direction Y1 is thus prevented.

In the above embodiments of the present invention, the disk loading mechanism in which the disk such as the CD-ROM is loaded or unloaded. However, the present invention is not limited to the above-described embodiments. The present invention is obviously applicable to another loading mechanism in which a recording medium different from the above-mentioned CD-ROM is loaded or unloaded. Various variations and modifications may be made without departing from the scope of the present invention.

What is claimed is:

1. A compact disk apparatus comprising:
   a tray including a toothed surface, said tray being arranged to be movable between a disk inserting/removing position and a disk loaded position;
   a movable base unit including a supporting part, said supporting part being capable of supporting a disk when the tray is at the disk loaded position, said movable base unit being arranged to be movable between an unsupported position and a supported position, the disk being supported on said supporting part when said movable base unit is at the supported position;
   drive means which converts electric current into a rotating force;
   first gear means which is engaged with said toothed surface of said tray, said tray being moved between the disk inserting/removing position and the disk loaded position when said first gear means is rotated through an engagement with the toothed surface of the tray;
   second gear means which is rotated by the rotating force of said drive means and engageable with said first gear means, said second gear means being arranged to be movable between a first position and a second position, wherein said second gear means is engaged with said first gear means when said second gear means is at the first position and rotated around a central rotation axis of the second gear means by said drive means, so that said first gear means is rotated through an engagement of said second gear means with the first gear means and the tray is moved to the disk loaded position,
   and wherein, after the tray reaches the disk loaded position and the movement of the tray is stopped, said second gear means is, with the engagement with said first gear means being maintained, moved around a periphery of said first gear means by said drive means, so that said second gear means is moved from the first position to the second position; and
   moving means for moving said movable base unit from the unsupported position to the supported position when said second gear means is moved from the first position to the second position; wherein
   said moving means comprises a rotating base which rotatably supports the second gear means on said rotating base and is rotatable around a central rotation axis of said first gear means, said rotating base being arranged to be rotatable, co-axially with the first gear means, between a third position at which the second gear means is placed at the first position and a fourth position at which the second gear means is placed at the second position, said compact disk apparatus further comprising a rotating base locking mechanism which locks the rotating base of the moving means when the rotating base is at the third position, and cancels the locking of the rotating base when the rotating base is rotated from the third position and cancels the locking of the rotating base when the rotating is rotated from the third position to the fourth position, said moving means is allowed to move the movable base unit from the unsupported position to the supported position when the locking of the rotating base is canceled.

2. The compact disk apparatus according to claim 1, wherein said moving means comprises a slider and a rotating base, said slider including a slanting slot to which a pin of the movable base unit is connected, and including a toothed surface engaged with a gear portion of the rotating base.

3. The compact disk apparatus according to claim 1, wherein the tray includes a projection and said moving means includes a rotating base, a tray lock arm and an arm guide, said rotating base being arranged to be rotatable from a third position to a fourth position, said tray lock arm including connecting portions capable of being connected to said tray, and said tray lock arm being rotated by said tray when said tray reaches the disk loaded position, said projection and said connecting portions thus serving to lock the tray at the disk loaded position.

4. The compact disk apparatus according to claim 1, further comprising a tray locking mechanism which includes a tray lock arm engageable with a projection of the tray, said tray lock arm having a projection which locks to the projection of the tray when the tray is at the disk loaded position, and cancels the locking of the tray when the tray is moved from the disk inserting/removing position to the disk loaded position.

5. A compact disk apparatus comprising:

a tray including a toothed surface, said tray being arranged to be movable between a disk inserting/removing position and a disk loaded position;

a movable base unit including a supporting part, said supporting part being capable of supporting a disk when the tray is at the disk loaded position, said movable base unit being arranged to be movable between an unsupported position and a supported position, the disk being supported on said supporting part when said movable base unit is at the supported position;

drive means which converts electric current into a rotating force;

first gear means which is .engaged with said toothed surface of said tray, said tray being moved between the disk inserting/removing position and the disk loaded position when said first gear means is rotated through an engagement with the toothed surface of the tray;

second gear means which is rotated by the rotating force of said drive means and engageable with said first gear means, said second gear means being arranged to be movable between a first position and a second position, wherein said second gear means is engaged with said first gear means when said second gear means is at the first position and rotated around a central rotation axis of the second gear means by said drive means, so that said first gear means is rotated through an engagement of said second gear means with the first gear means and the tray is moved to the disk loaded position, and wherein, after the tray reaches the disk loaded position and the movement of the tray is stopped, said second gear means is, with the engagement with said first gear means being maintained, moved around a periphery of said first gear means by said drive means, so that said second gear means force of the drive means, so that said second gear means is moved from the first position to the second position; and moving means for moving said movable base unit from the unsupported position to the supported position when said second year means is moved from accordance with said movement of said second gear means from the first position to the second position; and wherein said moving means comprises a rotating base having an arm guide, said rotating base rotatably supporting the second gear means on said rotating base and being rotatable around a central rotation axis of the first gear means, said rotating base being arranged to be rotatable, co-axially with the first gear means, between a third position at which the second gear means is placed at the first position and a fourth position at which the second gear means is placed at the second position, said compact disk apparatus further comprising a locking mechanism having a tray lock arm engageable with a projection of the tray, said tray lock arm being arranged to be rotatable between a rotating-base locked position, engaged with the arm guide of the rotating base at the third position and locking the rotating base, and a tray locked position, engaged with the projection of the tray at the disk loaded position and locking the tray, wherein said locking mechanism locks the rotating base when the tray is moved from the disk inserting/removing position to the disk loaded position, and locks the tray when the tray has reached the disk loaded position.

6. The compact disk apparatus according to claim 5, wherein said tray lock arm is moved from said rotating-base locked position to said tray locked position through the engagement with the projection of the tray when the tray is moved from the disk inserting/removing position to the disk loaded position.

7. The compact disk apparatus according to claim 5, wherein said moving means comprises a slider and a rotating base, said slider including a slanting slot to which a pin of the movable base unit is connected, and including a toothed surface engaged with a gear portion of the rotating base.

8. The compact disk apparatus according to claim 5, wherein the tray includes a projection and said moving means includes a rotating base, a tray lock arm and an arm guide, said rotating base being arranged to be rotatable from a third position to a fourth position, said tray lock arm including connecting portions capable of being connected to said tray, and said tray lock arm being rotated by said tray when said tray reaches the disk loaded position, said projection and said connecting portions thus serving to lock the tray at the disk loaded position.

9. The compact disk apparatus according to claim 5, further comprising a tray locking mechanism which includes a tray lock arm engageable with a projection of the tray, said tray lock arm having a projection which locks to the projection of the tray when the tray is at the disk loaded position, and cancels the locking of the tray when the tray is moved from the disk inserting/removing position to the disk loaded position.

* * * * *